(12) United States Patent
Bari et al.

(10) Patent No.: US 12,326,741 B2
(45) Date of Patent: Jun. 10, 2025

(54) COUNTER PRESSURE VALVE ARRANGEMENT

(71) Applicant: Parker Hannifin EMEA S.à.r.l., Etoy (CH)

(72) Inventors: Mahdi Sammy Bari, Båras (SE); Nils Heinerud, Bredared (SE); Anders Karlsson, Målsryd (SE); Bo Nilstam, Rimforsa (SE)

(73) Assignee: Parker Hannifin EMEA S.à.r.l., Etoy (CH)

( * ) Notice: Subject to any disclaimer, the term of this patent is extended or adjusted under 35 U.S.C. 154(b) by 0 days.

(21) Appl. No.: 18/520,772

(22) Filed: Nov. 28, 2023

(65) Prior Publication Data

US 2024/0094750 A1    Mar. 21, 2024

Related U.S. Application Data

(63) Continuation of application No. 18/068,569, filed on Dec. 20, 2022, now Pat. No. 11,906,986.

(30) Foreign Application Priority Data

Jan. 10, 2022  (SE) .................................. 2250011-0

(51) Int. Cl.
| F15B 13/02 | (2006.01) |
| F15B 13/043 | (2006.01) |
| G05D 16/20 | (2006.01) |

(52) U.S. Cl.
CPC .......... *G05D 16/2024* (2019.01); *F15B 13/02* (2013.01); *F15B 13/043* (2013.01); (Continued)

(58) Field of Classification Search
CPC ........................ F15B 11/0445; F15B 13/029; F15B 13/0417; F15B 2211/3055
See application file for complete search history.

(56) References Cited

U.S. PATENT DOCUMENTS 3,602,104 A * 8/1971 Stremple ............. F15B 13/0417
137/115.06
5,029,609 A    7/1991 Blok
(Continued)

FOREIGN PATENT DOCUMENTS

| JP | 2003247504 A | 9/2003 |
| WO | 2020154045 A1 | 7/2020 |
| WO | 2021193157 A1 | 9/2021 |

OTHER PUBLICATIONS

Co-pending claims of U.S. Appl. No. 18/068,569, filed Dec. 20, 2022.

*Primary Examiner* — Thomas E Lazo
(74) *Attorney, Agent, or Firm* — Renner, Otto, Boisselle & Sklar, LLP

(57) ABSTRACT

A counter pressure valve arrangement for controlling a pressure level of a hydraulic fluid in a return line from a hydraulic actuator arrangement. The counter pressure valve arrangement comprises a counter pressure valve having: a moveable valve member; a counter pressure regulating port configured for being connected to the hydraulic actuator arrangement via the return line; a tank port configured for being connected to a tank or low pressure reservoir for storing low pressure hydraulic fluid; and a pump port configured for being connected to a source of pressurised hydraulic fluid. A first position of the valve member effects fluid communication between the pump port and the counter pressure regulating port for supplying pressurised hydraulic fluid to the return line (4), and a second position of the valve member effects fluid communication between the counter pressure regulating port and the tank port for discharging hydraulic fluid from the return line to the tank.

19 Claims, 11 Drawing Sheets

(52) U.S. Cl.
CPC ..... *G05D 16/2022* (2019.01); *G05D 16/2026* (2013.01); *F15B 2211/5151* (2013.01)

(56) References Cited

U.S. PATENT DOCUMENTS

| | | | |
|---|---|---|---|
| 6,715,402 B2* | 4/2004 | Pfaff | F15B 11/006 |
| | | | 91/533 |
| 10,683,879 B1* | 6/2020 | Zähe | F15B 13/0442 |
| 11,906,986 B2* | 2/2024 | Bari | F15B 21/047 |
| 2005/0183775 A1 | 8/2005 | Cheong | |
| 2012/0067432 A1 | 3/2012 | Vigholm et al. | |
| 2013/0209276 A1 | 8/2013 | Hugosson | |
| 2014/0251470 A1* | 9/2014 | Bissbort | F15B 11/167 |
| | | | 137/565.17 |
| 2017/0307096 A1* | 10/2017 | Janecke | F16K 11/10 |
| 2018/0058040 A1* | 3/2018 | Kondo | E02F 9/2225 |
| 2021/0140448 A1* | 5/2021 | Busani | F15B 11/161 |
| 2022/0290406 A1 | 9/2022 | Kumagai et al. | |

* cited by examiner

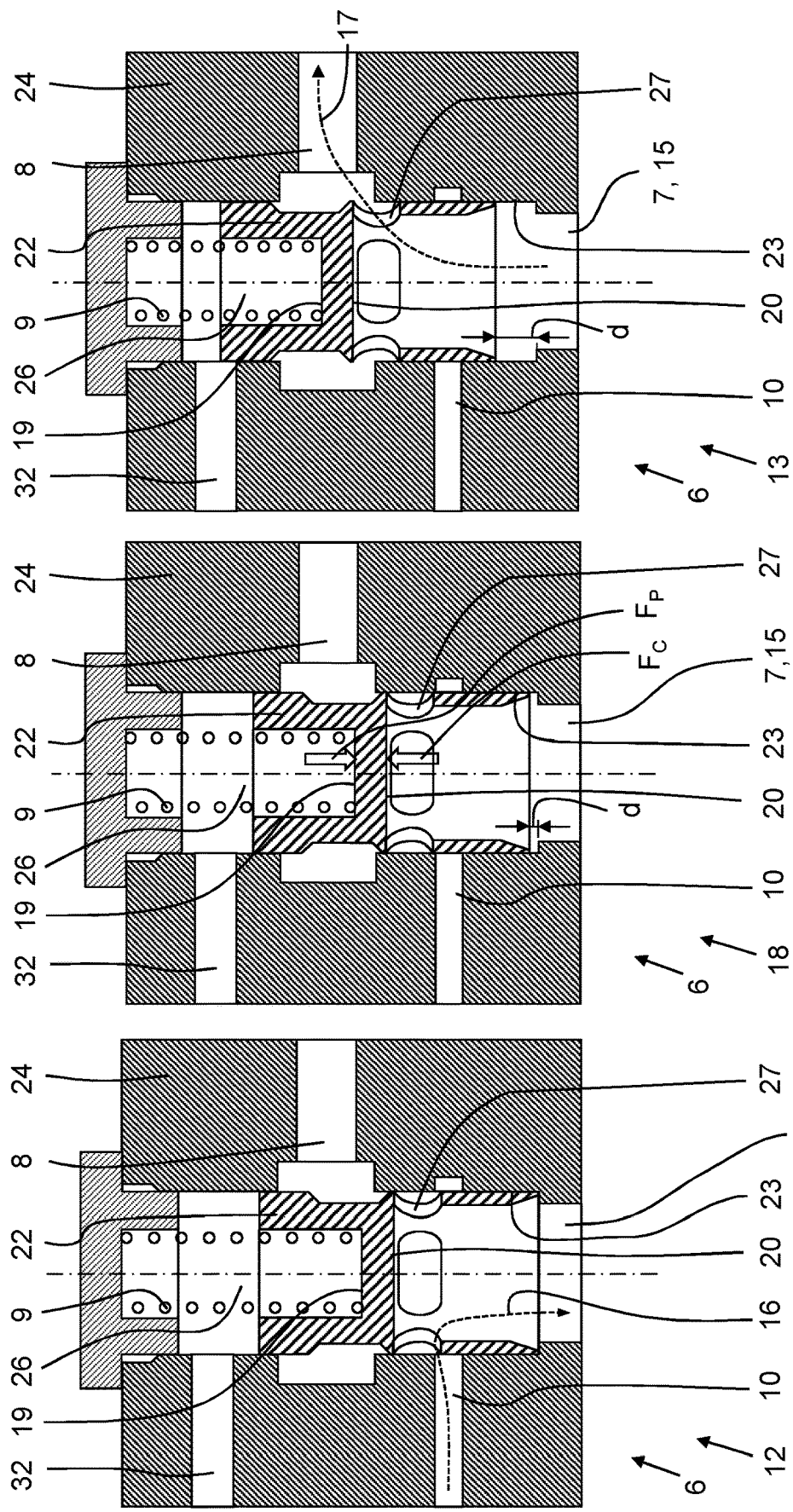

COUNTER PRESSURE VALVE ARRANGEMENT

RELATED APPLICATIONS

The present application is a continuation application of U.S. application Ser. No. 18/068,569 filed on Dec. 20, 2022, which claims priority to SE Appl. No. 2250011-0 filed on Jan. 10, 2022, the contents of which are incorporated herein by reference.

TECHNICAL FIELD

The present disclosure relates to a counter pressure valve arrangement and a method for controlling a pressure level of a hydraulic fluid in a return line from a hydraulic actuator arrangement.

The counter pressure valve arrangement and associated method according to the disclosure can be arranged or implemented in nearly any types of hydraulic systems having a hydraulic actuator, such as for example a hydraulic piston, a hydraulic motor, etc.

Moreover, even if the counter pressure valve arrangement and method according to the disclosure will be described primarily in relation to a hydraulic piston and forest vehicle, the counter pressure valve arrangement and method are not restricted to this particular hydraulic actuator and this particular type of vehicle, but may alternatively be equally well suited for being installed or implemented in another type of vehicle, such as a truck, a bus, a rail vehicle, a flying vehicle, a marine vessel, an off-road vehicle, a mining vehicle, an agriculture vehicle, a working vehicle such as a wheel loader or excavator, a motorcycle or the like.

BACKGROUND

In the field of hydraulic systems, there are under certain operating conditions a risk for cavitation in a hydraulic consumer, in particular during operating conditions when the hydraulic actuator cannot easily suck low pressure fluid from tank, and in which fluid supply via the pump is restricted for some reason, such as for example during float operating conditions and regenerative operation conditions of the hydraulic valve.

There is thus a need for an improved a hydraulic system having reduced risk for cavitation in the hydraulic actuator.

SUMMARY

An object of the present disclosure is to provide a counter pressure valve arrangement and a method for controlling a pressure level of a hydraulic fluid in a return line from a hydraulic actuator arrangement using a counter pressure valve arrangement, where the previously mentioned problems are avoided. This object is at least partly achieved by the features of the independent claims.

According to a first aspect of the present disclosure, there is provided a counter pressure valve arrangement for controlling a pressure level of a hydraulic fluid in a return line from a hydraulic actuator arrangement. The counter pressure valve arrangement comprising a counter pressure valve having: a moveable valve member; a counter pressure regulating port configured for being connected to the hydraulic actuator arrangement via the return line; a tank port configured for being connected to a tank or low pressure reservoir for storing low pressure hydraulic fluid; and a pump port configured for being connected to a source of pressurised hydraulic fluid; wherein a first position of the valve member effects fluid communication between the pump port and the counter pressure regulating port for supplying pressurised hydraulic fluid to the return line; and wherein a second position of the valve member effects fluid communication between the counter pressure regulating port and the tank port for discharging hydraulic fluid from the return line to the tank.

According to a second aspect of the present disclosure, there is provided a method for controlling a pressure level of a hydraulic fluid in a return line from a hydraulic actuator arrangement using a counter pressure valve arrangement. The method comprising: providing a counter pressure valve having a moveable valve member, a counter pressure regulating port, a tank port and a pump port; connecting the counter pressure regulating port to the hydraulic actuator arrangement via the return line, connecting the tank port to a tank having low pressure hydraulic fluid, and connecting the pump port to a source of pressurised hydraulic fluid; supplying pressurised hydraulic fluid to the return line by setting the valve member in the first position, thereby effecting fluid communication between the pump port and the counter pressure regulating port; and discharging hydraulic fluid from the return line to the tank by setting the valve member in a second position, thereby effecting fluid communication between the counter pressure regulating port and the tank port.

In this way, it becomes possible to provide an arrangement that merges a counter pressure functionality with an active refill functionality using a relatively cost-efficient design with few parts. In other words, a passive counter pressure functionality for the return line for maintaining a certain refill capacity to one or more hydraulic consumers of a hydraulic actuating arrangement, is combined with an active refill functionality for the purpose of avoiding that the counter pressure becomes too low, thereby effectively reducing the risk for cavitation in the one or more hydraulic consumers, all provided in a compact arrangement with few parts.

Further advantages are achieved by implementing one or several of the features of the dependent claims.

In some example embodiments, the valve member is configured to shift to the second position effecting fluid communication between the counter pressure regulating port and the tank port for discharging hydraulic fluid from the return line to the tank when the pressure level of the hydraulic fluid in the return line is above a first fixed or variable threshold value, and the valve member is configured to shift to the first position effecting fluid communication between the pump port and the counter pressure regulating port for supplying pressurised hydraulic fluid to the return line when the pressure level of the hydraulic fluid in the return line is below the first threshold value or below a second fixed or variable threshold value. By using a single valve member for controlling both fluid refill and pressure relief enables a compact and cost-efficient design.

In some example embodiments, that may be combined with any one or more of the above-described embodiments, the counter pressure valve is a spool valve, wherein the moveable valve member is spool axially slidable within a spool bore of a housing, wherein a first axial position of the spool corresponds to the active refill position of the counter pressure valve, and wherein a second axial position of the spool corresponds to the pressure relief position of the counter pressure valve. By using a spool valve, the valve is easy to control and the internal sealings are robust and reliable.

In some example embodiments, that may be combined with any one or more of the above-described embodiments, the counter pressure valve has a spring member acting on a first axial end of the moveable valve member for biasing the valve member towards the first position of the valve member. Thereby, the position of the valve member may be controlled during system shut-down.

In some example embodiments, that may be combined with any one or more of the above-described embodiments, the counter pressure valve has a spring member acting on a first axial end of the moveable valve member for biasing the valve member towards the first position of the valve member, and wherein the first threshold value is a fixed threshold value determined by the properties of the spring member, or wherein both the first and second threshold values are fixed threshold values determined by the properties of the spring member. The first and second threshold values may thus be relatively well-defined.

In some example embodiments, that may be combined with any one or more of the above-described embodiments, the counter pressure valve arrangement further has a counter pressure sensing path fluidly connecting the counter pressure regulating port with a counter pressure sensing port of the counter pressure valve, such that fluid pressure at the counter pressure regulating port acts on a second axial end of the valve member for biasing the valve member towards the second position. Thereby, automatic self-regulation of the counter pressure in the return line is accomplished, without need for sensors and complex control of the counter pressure valve.

In some example embodiments, that may be combined with any one or more of the above-described embodiments, the active refill position corresponds to the natural position of the counter pressure valve.

In some example embodiments, that may be combined with any one or more of the above-described embodiments, the valve member is configured to shift to a closed position stopping fluid communication between the counter pressure regulating port, the tank port and the pump port when the pressure level of the hydraulic fluid in the return line is equal to the first fixed or variable threshold value, or when the pressure level of the hydraulic fluid in the return line is below the first threshold value and above the second fixed or variable threshold value. Thereby, less hydraulic fluid is required from the pump, thereby saving energy.

In some example embodiments, that may be combined with any one or more of the above-described embodiments, the counter pressure valve is a 3-way, 3-position directional control valve, or a 3-way, 2-position directional control valve. Thereby, a cost-efficient design of the valve is provided.

In some example embodiments, that may be combined with any one or more of the above-described embodiments, the counter pressure valve is 3-position directional control valve, and wherein the three positions are: the second position, a centrally arranged closed position and the first position. Thereby, a cost-efficient design of the valve is provided, and the central closed position enables energy efficient control.

In some example embodiments, that may be combined with any one or more of the above-described embodiments, the tank port is closed when the counter pressure valve is set in the active refill position. Thereby, efficient fluid refill of the return line is accomplished.

In some example embodiments, that may be combined with any one or more of the above-described embodiments, the pump port is closed when the counter pressure valve is set in the second position. Thereby, fluid leakage from pump directly to tank is avoided.

In some example embodiments, that may be combined with any one or more of the above-described embodiments, each of the counter pressure regulating port, tank port and pump ports are closed when the counter pressure valve is set in the closed position. Thereby, counter pressure is maintained without active refill or relief in an energy efficient manner.

In some example embodiments, that may be combined with any one or more of the above-described embodiments, the counter pressure valve is proportional solenoid-controlled pilot-operated control valve. Thereby, the threshold value(s) for counter pressure refill and relief may be adjusted according to the specific circumstances and operating conditions, thereby enabling a significantly improved energy efficiency.

In some example embodiments, that may be combined with any one or more of the above-described embodiments, the counter pressure valve arrangement further comprises an electrohydraulic pilot valve that provides a variable pilot pressure acting on a first axial end of the valve member of the counter pressure valve. By using a electrohydraulic pilot valve for controlling the adjustable threshold values of the counter pressure valve, a cost-efficient design with a wide range of pilot pressures is accomplished, thereby enabling improved energy efficiency by adjustment of the threshold value(s) for counter pressure refill and relief according to the specific circumstances and operating conditions.

In some example embodiments, that may be combined with any one or more of the above-described embodiments, the electrohydraulic pilot valve has a input port configured to be fluidly connected to a pressure source, an output port configured to be connected to a pilot pressure port of a first axial end of the counter pressure valve via a pilot pressure line, and a discharge port configured to be connected to a tank or low pressure reservoir. Thereby, the pilot pressure and counter pressure in the return line 4 act on opposite sides of the valve member of the counter pressure valve, thereby enabling cost-efficient control and implementation of the counter pressure valve arrangement.

In some example embodiments, that may be combined with any one or more of the above-described embodiments, a throttle device is provided in the pilot pressure line fluidly connecting the outlet port of the pilot valve and pilot pressure port of the first axial end of the spool of the counter pressure valve. Thereby, transient pressure changes are dampened, while the more slow steering control of the counter pressure valve is maintained.

In some example embodiments, that may be combined with any one or more of the above-described embodiments, the counter pressure valve arrangement further comprising an electronic control system operably connected to the electrohydraulic pilot valve for controlling operation of the electrohydraulic pilot valve in real-time based on the operating condition of the hydraulic actuator arrangement. The electronic control system enables energy-efficient and robust control of the counter pressure valve.

In some example embodiments, that may be combined with any one or more of the above-described embodiments, the electronic control system is configured for controlling operation of the electrohydraulic pilot valve in real-time based on a pilot valve control setting, which defines a pilot valve control parameter as a function of one or more operating parameters of the hydraulic actuator arrangement. Thereby, an energy efficient control of the counter pressure valve is provided.

In some example embodiments, that may be combined with any one or more of the above-described embodiments, the counter pressure valve is proportional, solenoid-controlled, direct-operated control valve having a first solenoid acting directly or indirectly on a first axial end of the valve member for shifting the directional control valve to, or at least towards, the first position. A direct-operated control valve has the advantage of eliminating need for hydraulic fluid for controlling the counter pressure valve. Moreover, the direct-operated control valve is typically faster than the conventional control valve.

The disclosure also relates to a hydraulic actuator control circuit for controlling supply and discharge of hydraulic fluid to and from a hydraulic actuator. The hydraulic actuator control circuit comprises: the counter pressure valve arrangement as described above; a hydraulic pump; a tank for storing low pressure hydraulic fluid; a hydraulic actuator; a control valve arrangement having at least a first work port fluidly connected to a first flow port of hydraulic actuator, an inlet port fluidly connected to an outlet port of the hydraulic pump, and a discharge port fluidly connected to the counter pressure regulating port of the counter pressure valve arrangement. The control valve arrangement is configured for controlling a direction of supply of hydraulic oil to the hydraulic actuator and a direction of discharge of hydraulic oil from the hydraulic actuator. The counter pressure regulating port of the counter pressure valve is fluidly connected to the discharge port of the control valve arrangement via the return line. The tank port of the counter pressure valve is fluidly connected to the tank, and the pump port of the counter pressure valve is fluidly connected to a source of pressurised hydraulic fluid.

In some example embodiments, that may be combined with any one or more of the above-described embodiments, the hydraulic pump is fluidly connected also to the pump port of the counter pressure valve for supplying pressurised hydraulic fluid to the counter pressure valve, or wherein an auxiliary hydraulic pump is fluidly connected to the pump port of the counter pressure valve for supplying pressurised hydraulic fluid to the counter pressure valve.

In some example embodiments, that may be combined with any one or more of the above-described embodiments, the control circuit is not configured to supply pressurized hydraulic fluid from the hydraulic pump to the counter pressure valve and further to the tank without having passed the hydraulic actuator.

In some example embodiments, that may be combined with any one or more of the above-described embodiments, the control valve arrangement has a first work port fluidly connected to a first flow port of hydraulic actuator and a second work port fluidly connected to a second flow port of hydraulic actuator, wherein a first operating state of the control valve arrangement effect fluid communication between the inlet port and first work port of the control valve arrangement, as well as between the second work port and the discharge port of the control valve arrangement, and wherein a second operating state of the control valve arrangement effect fluid communication between the inlet port and second work port of the control valve arrangement, as well as between the first work port and the discharge port of the control valve arrangement.

In some example embodiments, that may be combined with any one or more of the above-described embodiments, the control valve arrangement is a spool-type directional control valve having at least 3-positions.

In some example embodiments, that may be combined with any one or more of the above-described embodiments, the control valve arrangement includes a stacked sectional or monoblock valve arrangement having at least one stacked valve section including a directional control valve having at least a first work port (A) fluidly connected to a first flow port of an individual hydraulic actuator, wherein the counter pressure valve is fluidly connected with a discharge port of the directional control valve of the at least one stacked section via a return line, and wherein the counter pressure valve arrangement is integrated in the stacked sectional or monoblock valve arrangement. This provides a compact and cost-efficient design.

The disclosure also relates to a vehicle comprising the hydraulic actuator control circuit as described above.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The counter pressure valve arrangement according to the disclosure will be described in detail in the following, with reference to the attached drawings, in which FIG. 1-4 schematically show various example embodiments of a self-regulating counter pressure valve arrangement, FIG. 5A-7 schematically show various example embodiments of a self-regulating pilot controlled counter pressure valve arrangement, FIG. 8A-C show an example implementation of the counter pressure valve in different operating states.

DESCRIPTION OF EXAMPLE EMBODIMENTS

Figure 1:
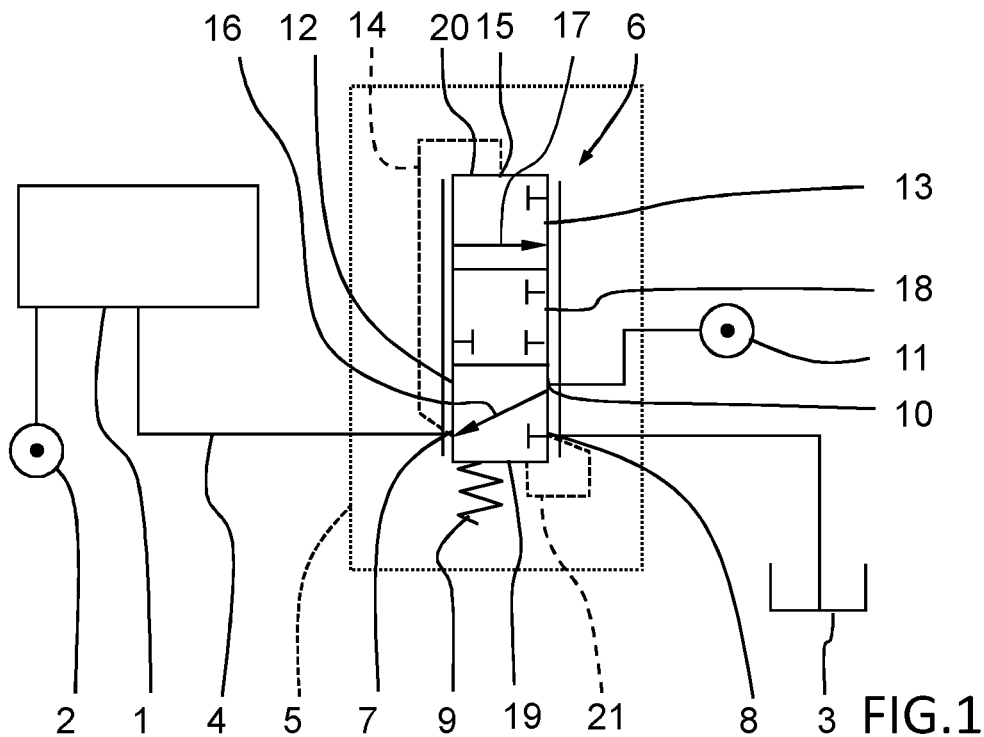

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

It may in certain hydraulic systems be desirable to complement the tank gallery of one or more directional control valves with a counter pressure functionality. This function relies on a pressure building mechanism in the tank gallery to aid in a refill of oil to the system consumers, such as for example hydraulic cylinders controlled by directional control valves, for preventing cavitation effects. If the hydraulic cylinder in question does not have enough oil, the pressure will decrease. When this pressure is below the tank gallery pressure, a refill to the cylinder will be initiated through a tank gallery refill.

A passive counter pressure functionality may be implemented by passing return oil from the consumer towards the tank through a pressure relief valve on its way to the tank, and in this process building a tank gallery pressure. Tank gallery herein typically refers to the network of flow lines and/or pipes routing hydraulic fluid from the various hydraulic consumers back to the tank, and in particular to the network of flow lines and/or pipes routing hydraulic fluid from one or more meter-out ports of control valves associated with the various hydraulic consumers back to said pressure relief valve. The pressure relief valve is for example set to build up a pressure in the range of 3-15 bar in the tank gallery and can have a fixed or variable pressure setting. The pressure building process is resulting from oil passing through the pressure relief valve.

In certain operating scenarios, the demanded refill to a first consumer or first set of consumers can exceed the available amount of returning oil from the first consumer or first set of consumers or a second consumer or second set of consumers, which means that all of the available oil will be used in the refilling process and none will be left to build tank gallery pressure. The consequence of such procedure yields many times in cavitation of the first consumer of first set of consumers. In these cases, pump oil needs to be directed to the tank gallery to sustain a requested counter pressure level. This is called active refill.

Active refill i.e. maintaining the counter pressure level in the tank gallery with the help of pump oil, may for example be implemented using a dedicated component for the active refill functionality, set to a fixed refill pressure level. Another separate component may then be used to create the passive counter pressure functionality, which can be set to a fixed or variable counter pressure level.

The present disclosure provides a new solution, in which active refill function is merged with the counter pressure function in a single arrangement, or even a single component. According to some example embodiments, the refill pressure, i.e. counter pressure in the tank gallery, may be proportionally controlled by an electrohydraulic pilot valve, a fixed spring, or a combination of the two mentioned.

FIG. 1 schematically shows a first example embodiment of the hydraulic circuit according to the disclosure. The hydraulic circuit has a hydraulic actuator arrangement 1, a source of pressurized hydraulic fluid 2, such as a fixed or variable displacement pump, a tank 3 or similar type of low pressure reservoir, connected to an outlet of the hydraulic actuator arrangement 1 via a return line 4.

The hydraulic actuator arrangement 1 includes for example at least one hydraulic actuator and at least one control valve for controlling the operation of the hydraulic actuator.

Actuation of the at least one hydraulic actuator may be accomplished by routing pressurized hydraulic fluid from the pressure source 2 to a first port of the hydraulic actuator via the at least one control valve, and routing return fluid exciting a second port of the hydraulic actuator to the tank via the at least one control valve and the return line 4.

The hydraulic circuit further includes a counter pressure valve arrangement 5 for controlling a pressure level of a hydraulic fluid in the return line 4 from the hydraulic actuator arrangement 1 The counter pressure valve arrangement 5 comprises a counter pressure valve 6 having: a moveable valve member, a counter pressure regulating port 7 configured for being connected to the hydraulic actuator arrangement 1 via the return line 4, a tank port 8 configured for being connected to the tank 3 or similar type of low pressure reservoir for storing hydraulic fluid or low pressure hydraulic fluid, and a pump port 10 configured for being connected to a refill pressure source 11 for supply of pressurised hydraulic fluid.

A first position 12 of the valve member effects fluid communication between the pump port 10 and the counter pressure regulating port 7 for supplying pressurised hydraulic fluid to the return line 4. A second position 13 of the valve member effects fluid communication between the counter pressure regulating port 7 and the tank port 8 for discharging hydraulic fluid from the return line 4 to the tank 3.

Hence, passive relief of overpressure in the return line 4 or an active refill of fluid to the return line 4 in case of underpressure is automatically accomplished with a single counter pressure valve 6.

The moveable valve member of the counter pressure valve 6 is movably arranged in a valve housing, which may be provided as an individual and separate component, or more or less integrated in the hydraulic actuator arrangement 1, e.g. integrated in a control valve housing of the hydraulic actuator arrangement 1.

The first and second positions 12, 13 of the valve member refer to two different switching positions of the valve member, and the valve member of the counter pressure valve 6 may have for example two, three or more switching positions.

The first position 12 of the valve member may also be referred to as active refill position, and the second position 13 of the valve member may be referred to as a pressure relief position.

In the first position 12, i.e. the refill position, the flow path between the counter pressure regulating port 7 and the tank port 8 is typically closed for preventing pressurized fluid from the refill pressure source 11 escaping directly to the tank 3. Similarly, in the second position 13, i.e. the pressure relief position, the flow path between the counter pressure regulating port 7 and the pump port 10 is typically closed for preventing pressurized fluid from the refill pressure source 11 entering the return line 4.

As schematically illustrated in FIG. 1, the counter pressure valve 7 may have a spring member 9 acting on a first axial end 19 of the moveable valve member for biasing the valve member towards the first position 12 of the valve member.

Consequently, the first position 12 of the valve member corresponds to the natural or neutral position of the counter pressure valve 7, i.e. a rest position of the valve member, also sometimes referred to as the position of the valve member in a de-energized state of the counter pressure valve 7.

Furthermore, in the example embodiment of FIG. 1, the counter pressure valve arrangement 5 has a counter pressure sensing path 14 fluidly connecting the counter pressure regulating port 7 with a counter pressure sensing port 15 of the counter pressure valve, such that fluid pressure at the counter pressure regulating port 7 acts on a second axial end 20 of the valve member for biasing the valve member towards the second position 13. Thereby, thanks to the spring member 9, a self-regulating automatic-refill counter pressure valve is accomplished.

Specifically, when the pressure level in the return line 4 increases, for example due to release of oil to the return line 4 from the hydraulic actuator arrangement 1, this increased pressure level spreads via the counter pressure sensing path 14 and acts on the second end 20 of the valve member for shifting the counter pressure valve towards the second position 13, i.e. pressure relief position, against the spring force of the spring member 9. When the fluid force resulting from the fluid pressure at the counter pressure regulating port 7 exceeds the spring force provided by the spring member 9, the valve member starts moving from the active refill position towards the pressure relief position.

On the other hand, if a hydraulic consumer of the hydraulic actuator arrangement 1 needs oil from the return line 4, the pressure in the return line 4 quickly sinks, thereby reducing the fluid force acting on the second end 20 of the valve member. As a result, the spring force of the spring element 9 pushes the moveable valve member towards the first position 12, such that a flow area of the pressure relief path 17 in the counter pressure valve 6 decreases, or even such that the refill of the return line 4 via a refill path 16 in the counter pressure valve 6 is initiated.

The counter pressure valve 6 may have a spring chamber for housing the spring member 9, and counter pressure valve 6 may have a drain passage 21 for draining hydraulic fluid from said spring chamber to the tank 3, or to a dedicated pilot pressure tank for reducing the risk that fluid pressure fluctuations in the tank 3 influences the operation of the counter pressure valve 6.

The counter pressure valve 6 may for example be implemented in form of a 3-way, 3-position control valve, as schematically depicted in FIG. 1.

When the counter pressure valve is implemented in a 3-position control valve, as illustrated in FIG. 1, the three positions may be: the first position 12 (active refill position), a transition point 18 and the second position 13 (pressure relief position).

The tank port 8 may be closed when the counter pressure valve 6 is set in the first position 12.

Furthermore, the pump port 10 may be closed when the counter pressure valve 6 is set in the second position 13.

In addition, in some example embodiment, each of the counter pressure regulating port 7, tank port 8 and pump ports 10 may be closed when the counter pressure valve 6 is set in the transition point 18.

The transition point 18 may be zero lapped, underlapped or overlapped. Underlapped transition point 18 means that both the refill path 16, which connects the pump port 10 with the regulating port 7, and the relief path 17, which connects the tank port 8 with the regulating port 7, are open simultaneously in the transition point. Zero lapped transition point 18 means that both the refill path 16 and relief path 17 are closed in the transition point 18, but even a small amount of valve member movement results in opening of either the refill path 16 or the relief path 17. Finally, overlapped transition point means that both the refill path 16 and the relief path 17 are closed over a certain actuation position range of the valve member.

Figure 2:
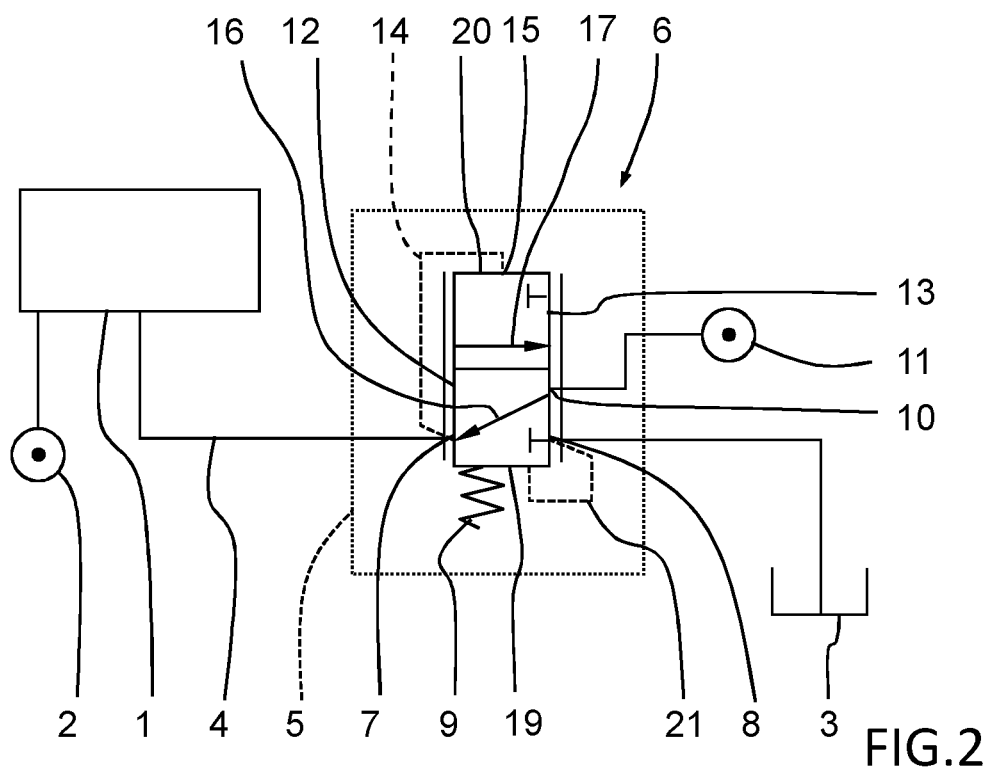

Still more alternatively, the counter pressure valve may be implemented as a 3-way, 2-position control valve, as schematically illustrated in FIG. 2. Other valve configurations are also possible within the scope of the present disclosure.

Figure 3:
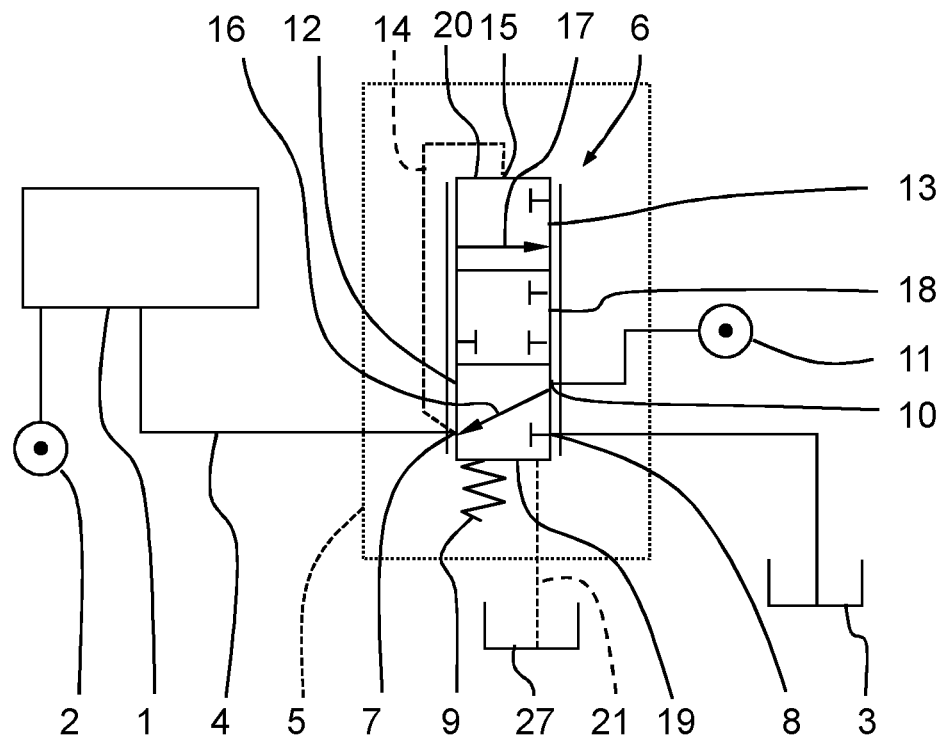

For example, as schematically illustrated in FIG. 3, in case the counter pressure valve 6 may has a drain passage 21 for draining hydraulic fluid from said spring chamber, the drain passage 21 may be connected to a dedicated pilot pressure tank for reducing the risk that fluid pressure fluctuations in the tank 3 influences the operation of the counter pressure valve 6.

Figure 4:
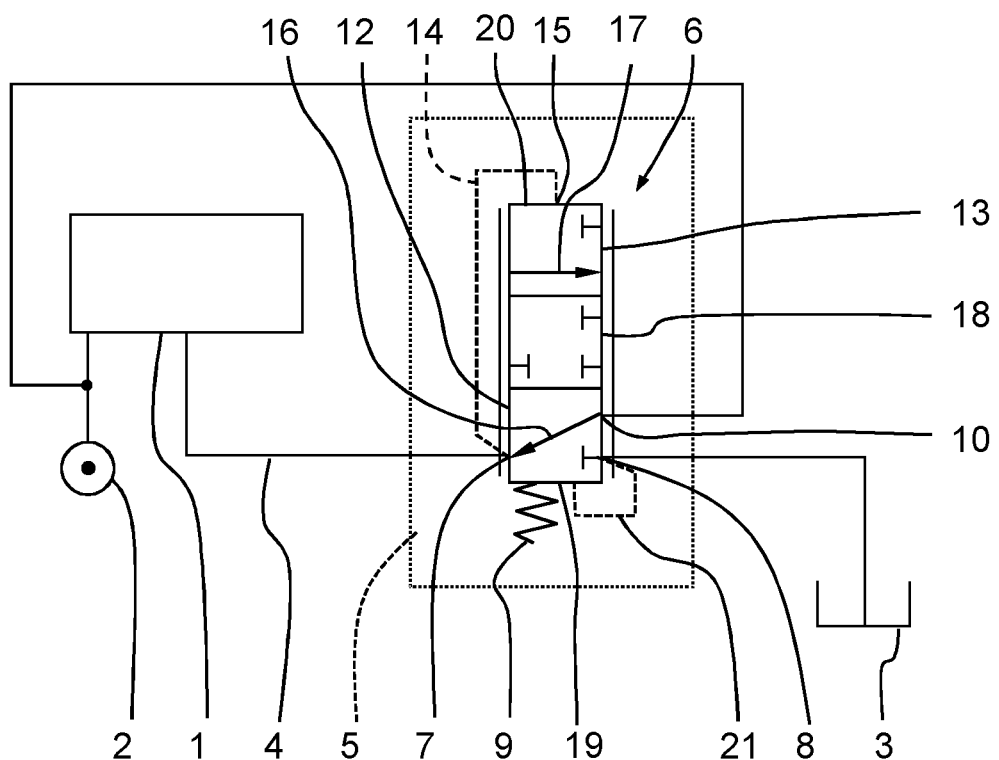

A further variation of the counter pressure valve arrangement is schematically illustrated in FIG. 4, in which a dedicated refill pressure source 11 has been omitted and replaced by supply from the main pressure source 2, possibly including an intermediate pressure reducing valve (not showed) if desired. This has the advantage of sharing the same pressure source, e.g. hydraulic fixed or variable displacement pump, thereby reducing overall cost.

In the example embodiments of FIGS. 1-4, the spring member 9 may be a fixed or adjustable spring member. For example, the spring member 9 may be more or less preloaded using a set screw or the like.

Figure 5A:
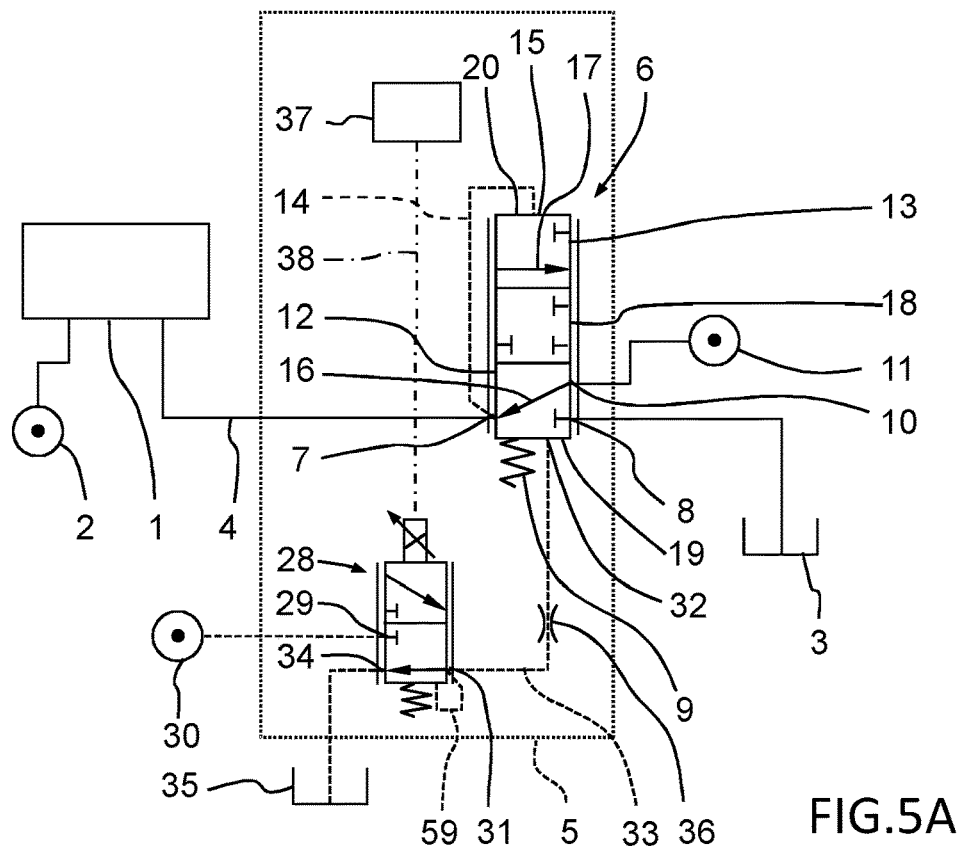

Still a further variation of the counter pressure valve arrangement 5 is schematically illustrated in FIG. 5A, in which the counter pressure valve 6 is proportional solenoid-controlled pilot-operated control valve.

In other words, a target counter pressure value within the return line may be easily set and adjusted by applying an appropriate pilot pressure on the valve member using a proportional solenoid-controlled pilot valve 28, i.e. an electrohydraulic pilot valve.

The pilot valve 28 may be integrated in the same housing as the counter pressure valve 6 or be arranged in a separate housing.

The electrohydraulic pilot valve 28 provides a variable pilot pressure acting on the first axial end of the valve member of the counter pressure valve. The pilot pressure from the pilot valve 28 is working together with the spring member 9 for biasing the valve member towards the first position 12 of the valve member.

When the pilot valve 28 is provided for applying a certain actuation force on the first end of the valve member, the actuation force provided by the spring member 9 may be reduced. For example, the spring force provided by the spring member 9 may be provided primarily for ensuring that the counter pressure valve is set in the first position 12 upon start up. In some example embodiments, the spring member 9 may even be omitted, leaving only the pilot valve 28 for urging the valve member to the first position 12.

The electrohydraulic pilot valve 28 may be implemented in various ways. For example, as schematically showed in FIG. 5A, the pilot valve 28 may have an input port 29 configured to be fluidly connected to a pilot pressure source 30, an output port 31 configured to be connected to a pilot pressure port 32 of the first axial end of the counter pressure valve 6 via a pilot pressure line 33, and a discharge port 34 configured to be connected to a tank or low pressure reservoir, such as for example a pilot tank 35 or the tank 3.

An advantage of using a dedicated pilot tank 35 may be reduced risk for fluid pressure fluctuations in the tank, for example influenced by operation of other hydraulic parts of the hydraulic system, thereby reducing risk for undesirable fluctuations in the applied force acting on the valve member.

A throttle device 36 may optionally be provided in the pilot pressure line 33 fluidly connecting the outlet port 31 of the pilot valve 28 and pilot pressure port 32 of the first axial end of the valve member of the counter pressure valve 6. The throttle device acts as a low pass filter that prevents pressure transients stemming from for example the pilot tank 35 or the pilot pressure source 30 from reaching the counter pressure valve 6.

The counter pressure valve arrangement may further comprise an electronic control system 37 operably connected to the electrohydraulic pilot valve 28 via for example a wired or wireless communication line 38, such as a communication bus, for controlling operation of the electrohydraulic pilot valve 28 in real-time based on for example a current or near future operating condition of the hydraulic actuator arrangement 1.

The pilot valve 28 allows improved control of the counter pressure in the return line 4 by merely supplying an appropriate pilot pressure to the counter pressure valve. For example, if the electronic control system 37 of the counter pressure valve arrangement 5 detects that the current or near future operating conditions of the hydraulic actuator arrangement 1 would operate more efficiently with a high counter pressure in the return line 4, the electronic control system 37 can quickly raise the counter pressure in the return line 4 by simply controlling the pilot valve 28 to increase the pilot pressure, such that the counter pressure valve 6 moves towards the active refill position 12 and thus, depending on operating conditions, either reduces the opening area of the pressure relief path 17 connected to the tank or increases the opening area of the refill path 17 connected to the pump.

Similarly, if the electronic control system 37 of the counter pressure valve arrangement 5 detects that the current or near future operating conditions of the hydraulic actuator arrangement 1 would operate more efficiently with a lower counter pressure in the return line 4, the electronic control system 37 can quickly decrease the counter pressure in the return line 4 by simply controlling the pilot valve 28 to decrease the pilot pressure, such that the counter pressure valve 6 moves towards the pressure relief position 13 and thus, depending on operating conditions, either decreases the opening area of the refill path 17 connected to the pump, or increases the opening area of the pressure relief path 17 connected to the tank.

In other words, the pilot valve 28 allows improved control of the counter pressure in the return line 4 by merely supplying an appropriate pilot pressure to the counter pressure valve 6, thereby enabling a more efficient control strategy of the counter pressure in the return line 4.

A control logic could be implemented in the electronic control system 37 for setting the counter pressure levels in real-time or create an input mapping for different operating scenarios. This would for example allow for scalable control automation of the counter pressure valve functionality with respect to energy losses in a range of operating cases.

For example, during a conventional powered operation of the hydraulic actuator arrangement 1, such as for example lifting of a load by supplying pressurised fluid from the main pressure source, a low counter pressure in the return line 4 would be desirable for the purpose of reducing the load of the main pressure pump 2.

However, if the hydraulic actuator arrangement 1 operates in a recuperation mode or the like, a certain amount of fluid from the return line 4 may be needed by the actuator arrangement. In such an operating condition, it may be beneficial to temporarily increase the pressure in the return line 4 for simplifying refill from return line and for reducing risk for cavitation in the hydraulic actuator arrangement 1.

The pressure in the return line 4 acts on the second side 20 of the valve member 22 and the control pressure from pilot valve 28 in a combination with the force provided by the spring element 9 acts on the opposite first side of the valve member 22, and the force equilibrium over the valve member 22 ensures that the pressure level in return line 4 follows the set control pressure of the pilot valve 28. The pilot valve 28 may thus be used for providing a variable counter pressure level in the return line 4, and depending on the operating conditions, the valve member 22 is either in the active refill position 12 or in the pressure relief position 13, or a transition point 18 if the counter pressure valve 6 includes such a position.

Moreover, in some example embodiments, the electronic control system 37 may be configured for controlling operation of the electrohydraulic pilot valve 28 in real-time based on a pilot valve control setting derived from for example a look-up table, which defines a pilot valve control parameter, such as for example pilot pressure, current level, pulse-width-modulation duty-rate, or the like, as a function of one or more operating parameters, such as counter pressure in return line 4; operating condition of actuator arrangement 1, fluid pressure in actuator arrangement 1 or associated supply/discharge lines, position of actuator, spool position of directional control valve, etc., of the hydraulic actuator arrangement.

In other words, the electronic control system 37 may be configured for controlling operation of the electrohydraulic pilot valve 28 in real-time by obtaining information about current status of one or more operating parameters of the hydraulic actuator arrangement 1, and in response thereto controlling operation of the pilot valve 28 based on a pilot valve control setting derived from for example a look-up table and said status of one or more operating parameters of the hydraulic actuator arrangement 1. Alternatively, the pilot valve control setting may be derived from an intelligent function, such as an expert system or AI-system, operating in real time.

The pilot valve 28 may include a pressure feedback line connecting the output port 31 of the pilot valve 28 with a spring chamber of the pilot valve 28, or the like, such that the pressure in the pilot pressure line 33 acts together with the return spring of the pilot valve for moving the valve member of the pilot valve towards the open position.

In certain circumstances or installations of counter pressure valve arrangement 5 having a pilot controlled counter pressure valve 6, there may be a need for further improved robustness of the control of the spool of the counter pressure valve 6, for example in installations with pressure variations/ripple in the pilot pressure source 30. Such improved robustness may then be provided by introducing a controlled level of pilot leakage flow from the pilot pressure line 33, which connects the output port 31 of the pilot valve 28 with the pilot pressure port 32 of the first axial end 19 of the counter pressure valve 6.

Figure 5B:
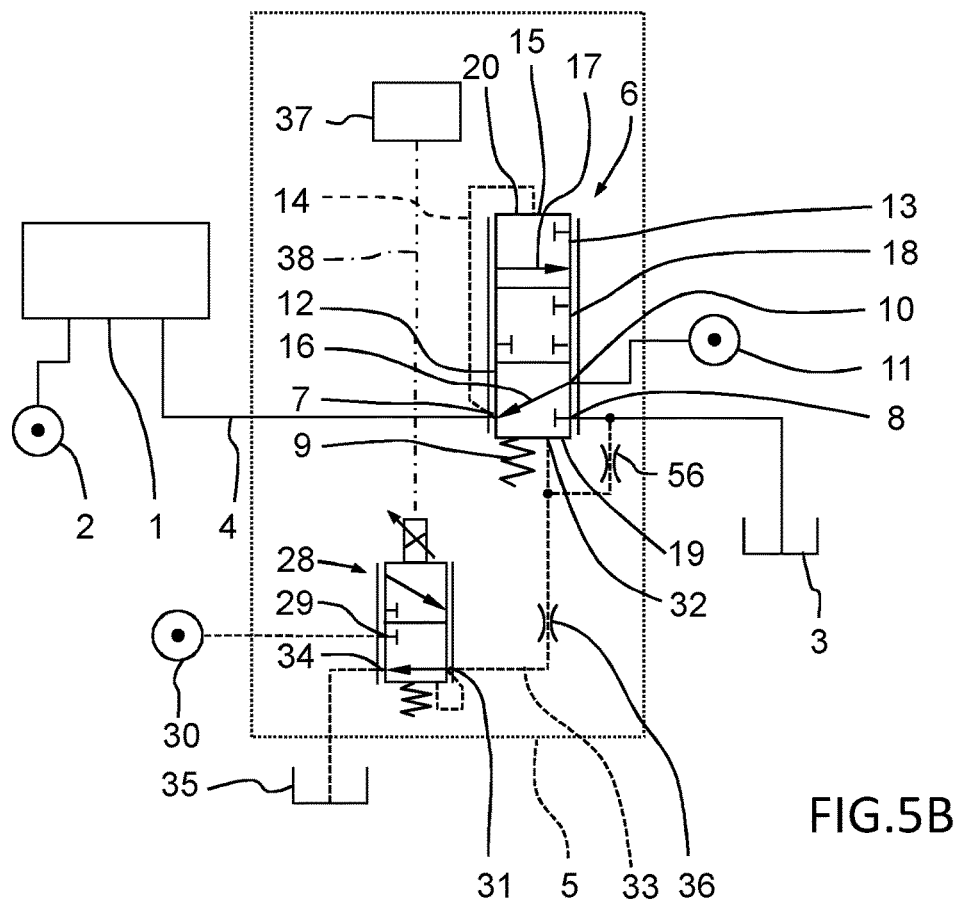

FIG. 5B schematically shows one cost-efficient example embodiment of implementation of such pilot leakage flow, namely by connecting the pilot pressure line 33 and the tank 3 via a leakage throttle 56. Thereby, potential small pressure variations/ripple in the pilot pressure source 30 will have reduced effect on the motion/position of the spool of the counter pressure valve 6, and thus acting as a low pass filter that provides a more robust and stable control of the counter pressure valve 6.

Figure 5C:
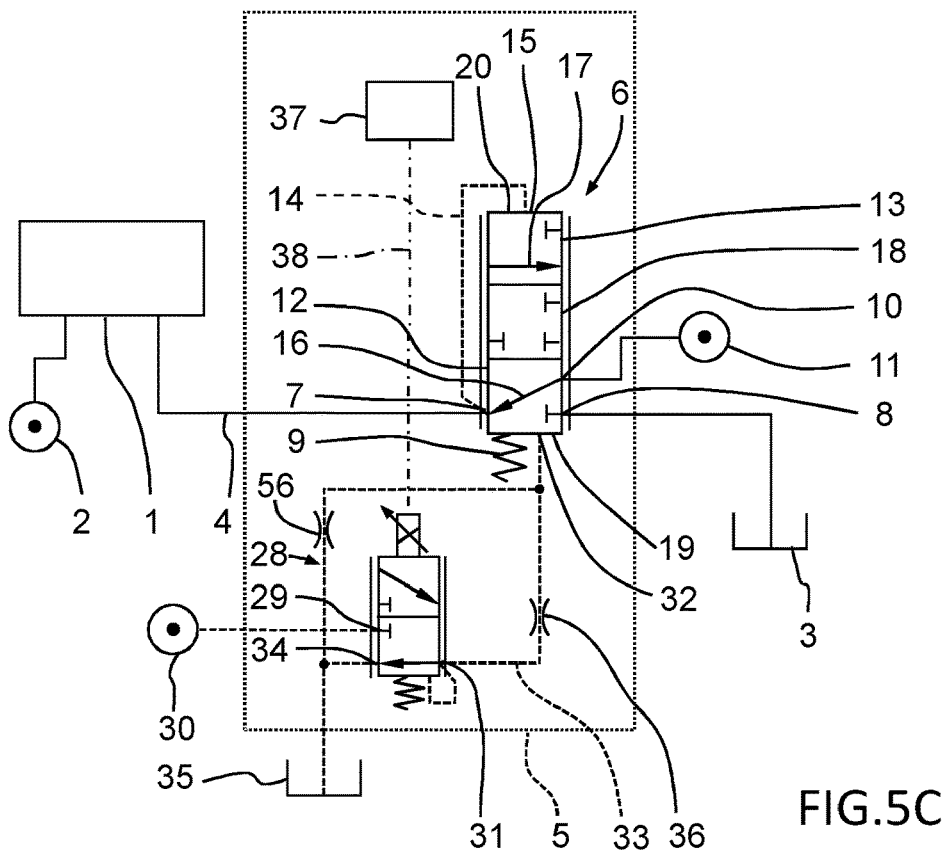

Said pilot leakage flow may be implemented in a variety of ways, as long as the pilot pressure line 33 is connected to a low pressure reservoir or region via the leakage throttle 56. For example, FIG. 5C schematically shows a further cost-efficient example embodiment of implementation of such pilot leakage flow, namely by using the pilot tank 35 as low pressure reservoir. Hence, in this example embodiment, the pilot pressure line 33 is connected to the pilot tank 35 via a leakage throttle 56.

In the example embodiments of FIGS. 5B and 5C, the leakage throttle 56 was connected to the pilot pressure line 33 at a point between the throttle device 36 and the pilot pressure port 32 of the first axial end 19 of the counter pressure valve 6. However, in some example embodiments, depending the circumstances, it may be better to connect the leakage throttle 56 to the pilot pressure line 33 at a point between the throttle device 36 and the output port 31 of the pilot valve 28.

Furthermore, in still some example embodiments, the throttle device 36 may be omitted and the counter pressure valve arrangement relying merely on the leakage throttle 56 for providing a robust and stable control of the counter pressure valve 6.

Figure 5D:
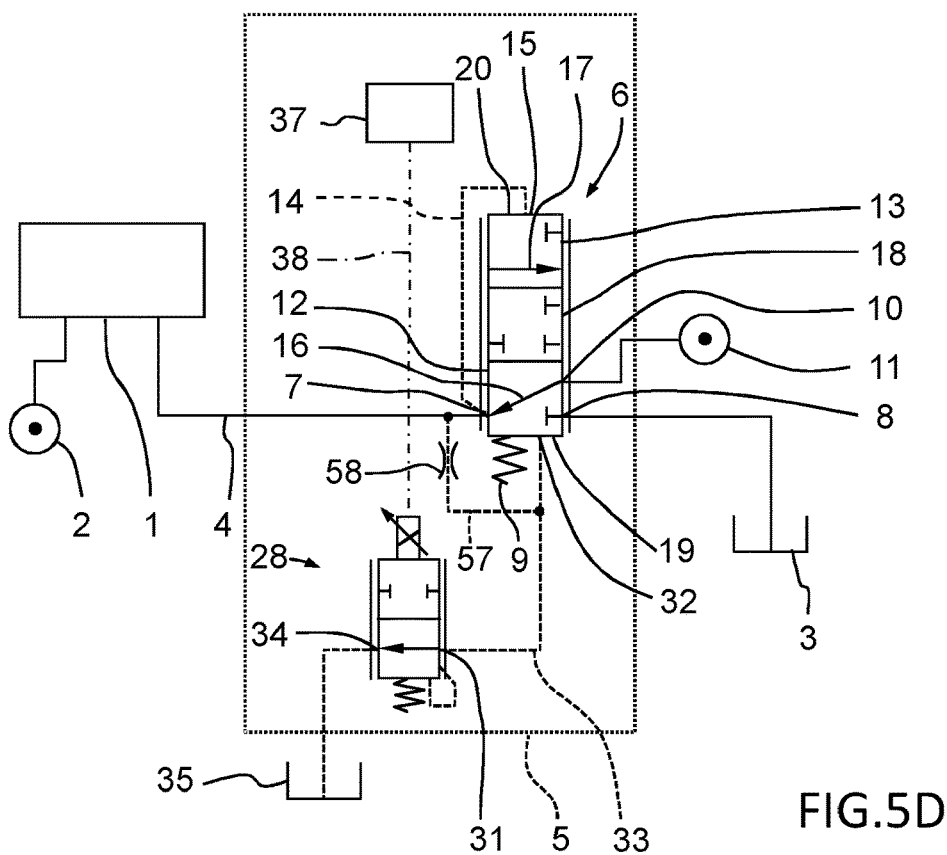

Still a further variation of the counter pressure valve arrangement 5 is schematically illustrated in FIG. 5D. This example embodiment corresponds largely to the example embodiment of FIG. 5A and reference is made to FIG. 5A and the associated description for those parts of the counter pressure valve arrangement that are identical in FIGS. 5A and 5D. A novel aspect of the example embodiment of FIG. 5D is shift from an active pilot valve 28 that supplies pressurized pilot fluid from the external pilot pressure source 30 to the pilot pressure port 32, to a passive pilot valve 28 lacking connection to an external pilot pressure source 30. Instead, the pilot valve 28 is dependent on supply of pressurized fluid from the return line 4 to the pilot pressure line 33, and the pilot valve 28 merely controls the release of pressurized fluid from the pilot pressure line 33 for setting a target counter pressure level of the return line 4.

Consequently, the counter pressure valve arrangement of FIG. 5D comprises a pilot pressure supply line 57 connecting the return line 4 with the pilot pressure line 33. A pilot throttle 58 may be provided in the pressure supply line 57 for acting as a low pass filter that prevents pressure transients from reaching the pilot pressure port 32, and for avoiding large leakage of hydraulic fluid from the return line 4 to the pilot tank 35 via the pilot valve 28.

Furthermore, the pilot valve 28 may be arranged for providing proportional control of an outlet passage from the pilot pressure line 33 to a pilot tank 35 or the tank 3. This is for example accomplished by using a proportional electrohydraulic 2/2-way valve, or the like.

The pilot valve 28 acts an adjustable pressure limiter, wherein the pressure level of the pilot pressure line 33 is partly controlled by the electronic control unit 37 via a solenoid of the electrohydraulic pilot valve 28.

The pilot pressure from the pilot valve 28 is working together with the spring member 9 for biasing the valve member towards the first position 12 of the valve member.

The valve member of the counter pressure valve 6 is always self-adjusting to an equilibrium position defined by the counter pressure supplied to the counter pressure sensing port 15 acting on the second axial side 20, and the combined pilot pressure and spring force of spring member 9 on the first axial side 19 of the valve member. At the equilibrium position, the pressure level in the return line 4 is always slightly higher than the pilot pressure in the pilot pressure line 33 due the spring force. There is thus, at the equilibrium position, a certain flow of hydraulic fluid from the return line 4 to the pilot pressure line 33 via the pilot throttle 58, and further to the pilot tank 35, thereby providing a fluid supply to the pilot valve 28.

In case the need for fluid refill in one hydraulic actuator of the hydraulic actuating arrangement 1 is larger than the return flow from one or more other hydraulic actuators or devices of the hydraulic actuating arrangement 1, the pressure in the return line 4 will decrease in the return line 4 and thus on both sides of the valve member of the counter pressure valve 6, but the spring member 9 will cause the valve member to shift to an active refill position, thereby opening the refill path 16 between the pump port 10 and the pressure regulating port 7 for enabling refill flow of fluid into the return line 4, thereby increasing the pressure in the return line 4 until the valve member of the counter pressure valve 6 has reached its equilibrium position again.

Figure 6:
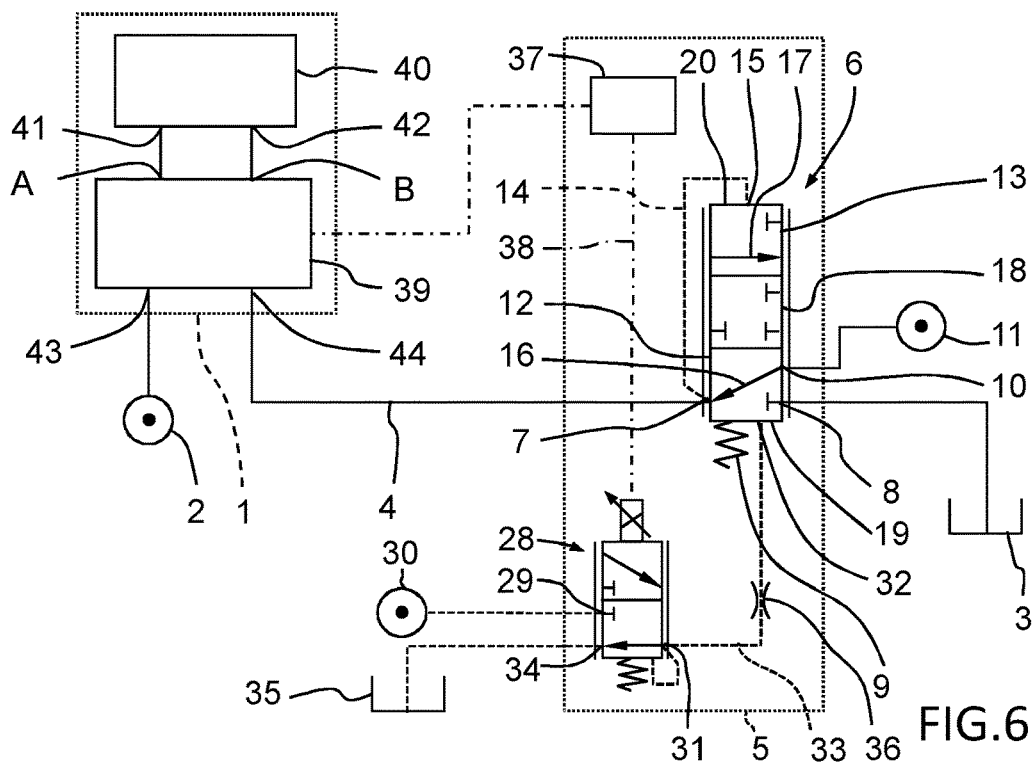

FIG. 6 schematically shows a hydraulic actuator control circuit for controlling supply and discharge of hydraulic fluid to and from a hydraulic actuator 40, wherein the hydraulic actuator control circuit comprises the counter pressure valve arrangement 5 described above with reference to FIG. 5A. Specifically, the hydraulic actuator control circuit further comprises a hydraulic pump 2, a tank 3 for storing low pressure hydraulic fluid, a hydraulic actuator 40, and a control valve arrangement 39 having at least a first work port A fluidly connected to a first flow port 41 of the hydraulic actuator 40, a second work port B fluidly connected to a second flow port 42 of hydraulic actuator 40, an inlet port 43 fluidly connected to an outlet port of the hydraulic pump 2, and a discharge port 44 fluidly connected to the counter pressure regulating port 7 of the counter pressure valve arrangement 5.

In some example embodiments, the control valve arrangement is a spool-type directional control valve having at least 3-positions.

The control valve arrangement 39 may for example be at least one directional control valve for controlling operation of the hydraulic actuator 40, or a plurality of individual control valves, each having a specific task, such as individual meter-in/meter-out, or the like.

Moreover, the control valve arrangement is configured for controlling a direction of supply of hydraulic oil to the hydraulic actuator 40 and a direction of discharge of hydraulic oil from the hydraulic actuator 40.

In addition, the counter pressure regulating port 7 of the counter pressure valve 6 is fluidly connected to the discharge port 44 of the control valve arrangement 39 via the return line 4, and possibly also via an additional hydraulic component, such as meter-out valve, etc. The tank port 8 of the counter pressure valve 6 is fluidly connected to the tank 3, possible via a some additional hydraulic component, and the pump port 10 of the counter pressure valve 6 is fluidly connected to a source 11 of pressurised hydraulic fluid, such as an auxiliary hydraulic pump.

As mentioned above, the pump port 10 of the counter pressure valve may be fluidly connected with an auxiliary hydraulic pump 11 for supplying pressurised hydraulic fluid to the counter pressure valve. Alternatively, the pump port 10 of the counter pressure valve 6 may be fluidly connected to the main hydraulic pump 2 for supplying pressurised hydraulic fluid to the counter pressure valve.

Consequently, the control circuit is not generally configured to supply pressurized hydraulic fluid from the main hydraulic pump 2 to the counter pressure valve 6 and further to the tank 3 without having passed the hydraulic actuator 40.

Figure 7:
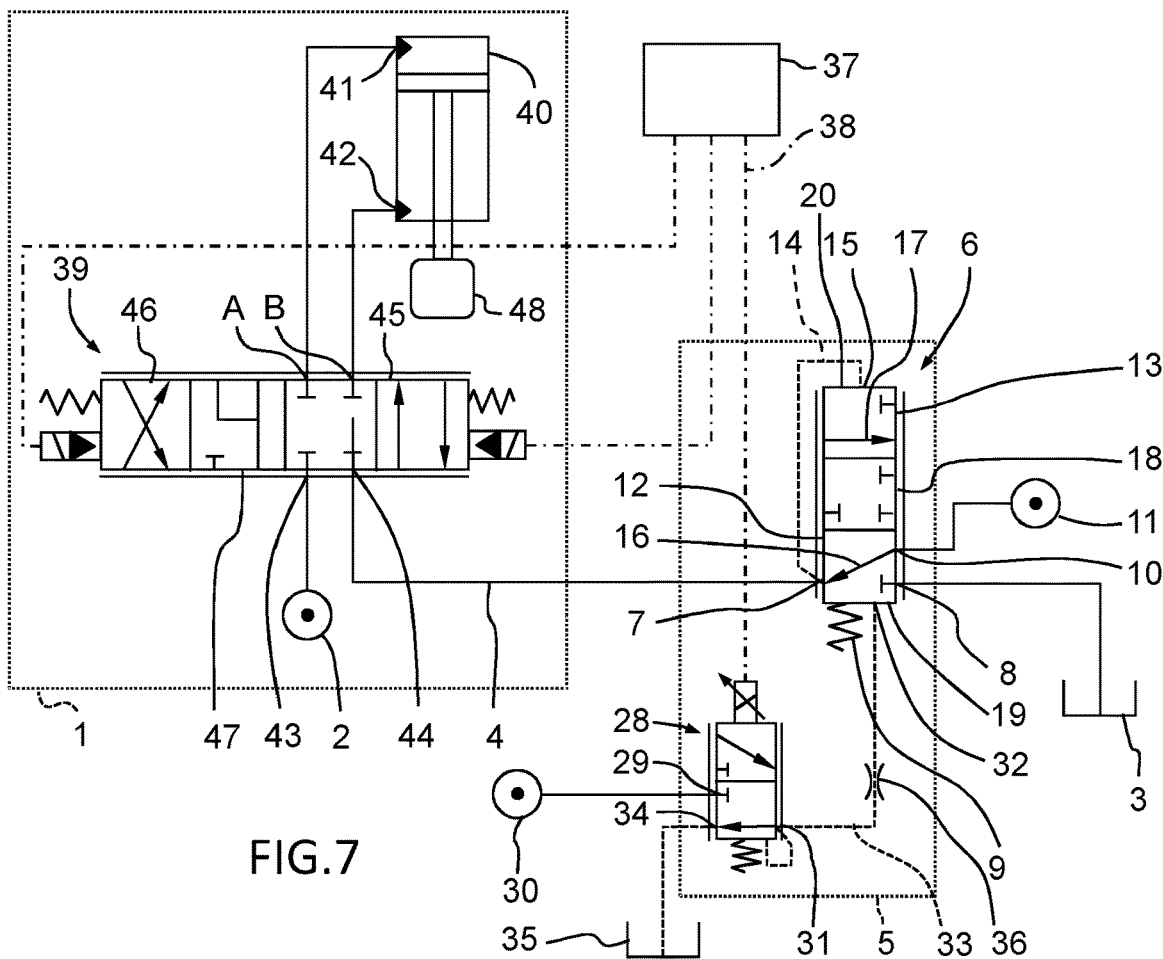

A more detailed example embodiment of the hydraulic actuator arrangement 1 is described below with reference to FIG. 7. Specifically, the control valve arrangement 39 includes a pilot controlled control valve having a first work port A fluidly connected to the first flow port 41 of hydraulic actuator 40 and a second work port B fluidly connected to a second flow port 42 of the hydraulic actuator 40. Furthermore, a first operating state 45 of the control valve arrangement 39 effects fluid communication between the inlet port 43 and first work port A of the control valve arrangement, as well as between the second work port (B) and the discharge port 44 of the control valve arrangement 39. Moreover, a second operating state 46 of the control valve arrangement 39 effects fluid communication between the inlet port 43 and second work port B of the control valve arrangement 40, as well as between the first work port A and the discharge port 44 of the control valve arrangement 39.

In addition, the control valve arrangement 39 may in some example embodiments include a third operating state 47 of the control valve arrangement 39. The third operating state 47 may correspond to a float position, which in certain operating conditions may require a certain level of fluid refill from the return line in case a load 48 connected to the piston of the hydraulic actuator 40 is allowed to sink downwards due to for example gravity. In such operating conditions, cavitation may occur in the head chamber of the actuator 40 due to low fluid pressure in the return line 4, unless the counter pressure arrangement actively refills the return line 4 in response to detected low pressure.

The counter pressure valve 6 according to the present disclosure may be implemented in a variety of alternative ways. One example embodiment of an implementation of the counter pressure valve 6 is schematically described with reference to FIGS. 8A-8C, wherein FIG. 8A shows that counter pressure valve 6 in the fluid refill position, i.e. the first position 12, FIG. 8B shows that counter pressure valve 6 in the transition point 18, and FIG. 8C shows that counter pressure valve 6 in the pressure relief position, i.e. the second position 13.

In this example embodiment, the counter pressure valve 6 has valve member 22 in form of spool that is axially moveable in a spool bore 23 provided in a valve housing 24. The spool has a sleeve portion with a plurality of holes 27 in the sleeve. The valve member 22 is biased towards the first position 12 by the spring member 9, which is arranged in a spring chamber 26.

In FIG. 8A, the pressure at the pressure regulating port 7, which acts on second axial end 20 of the valve member 22, is relatively low, such that the spring member 9 in form of a helical spring pushes the valve member 22 towards the first position 12, in which the valve member 22 abuts a valve seat of the valve housing 24. The first position 12 may be referred to as a natural state of the valve member 22 when no pressure acts on the first or second axial ends 19, 20 of the valve member 22. In this position of the valve member 22, the refill path 16 is open between the pump port 10 and the pressure regulating port 7 for enabling refill flow of fluid into the return line 4, while the tank port 8 is closed.

In FIG. 8B, the fluid pressure at the pressure regulating port 7 has increased a bit, such that the valve member 22 has moved a distance "d" against the force of the spring member 9 and pilot pressure to a new position, which corresponds to the transition point 18. The counter force $F_C$ acting on the second axial end 20 of the valve member 22 is here approximately equal to a pilot force $F_P$ acting the first axial end 19 of the valve member 22, wherein the level of the pilot force $F_P$ corresponds to the accumulated value of the spring force of the spring member 9 and any pilot pressure force acting on the valve member 22 via pilot pressure port 32, thereby providing a force equilibrium. As a result, both the pressure regulating port 7 and the tank port 8 are closed. This operating state is primarily a transition position of the valve member 22 during normal operation of the hydraulic system. This operating state also represents the final position of the valve member 22 when all hydraulic consumers connected to the counter pressure valve is inactive and the target counter pressure in the return line 4 has been reached, i.e. when there is zero flow between the counter pressure valve 6 and the hydraulic consumer(s).

With reference to FIG. 8C, if the pressure level increases further in the return line 4 and thus also at the pressure regulating port 7, the valve member 22 moves further away from the first position 12 to a new position, which in this example embodiment corresponds to the second position 13. The increased counter force $F_C$ acting on the second axial end 20 of the valve member 22 is here approximately equal to the pilot force $F_P$ acting the first axial end 19 of the valve member 22, wherein the level of the pilot force $F_P$ corresponds to the accumulated value of the spring force of the spring member 9 and any pilot pressure force acting on the valve member 22 via pilot pressure port 32, thereby providing a force equilibrium. In this position of the valve member 22, the pressure relief path 17 is open between the pressure regulating port 7 and the tank port 8 for enabling release of fluid from the return line 4 to the tank 3, while the pump port 10 is closed.

It is thus clear that the valve member 22 adjusts it's position automatically in response to the counter pressure supplied to the counter pressure sensing port 15, and that a target counter pressure level is set by the accumulated value of the pilot pressure supplied to the pilot pressure port 32 and the spring force provided by the spring member 9. It is also clear that the counter pressure valve 6 functions also without pilot control, using only a spring member 9, but in a less flexible way.

The example embodiment of the counter pressure valve 6 FIGS. 8A-8C also shows that, when implemented in practice, the counter pressure valve 6 may have a design that differs from the schematic illustrations of FIGS. 1-7 and 10-13. For example, as shown in FIGS. 8A-C, the pressure regulating port 7 and the counter pressure sensing port 15 may be the same port.

Figure 9A:
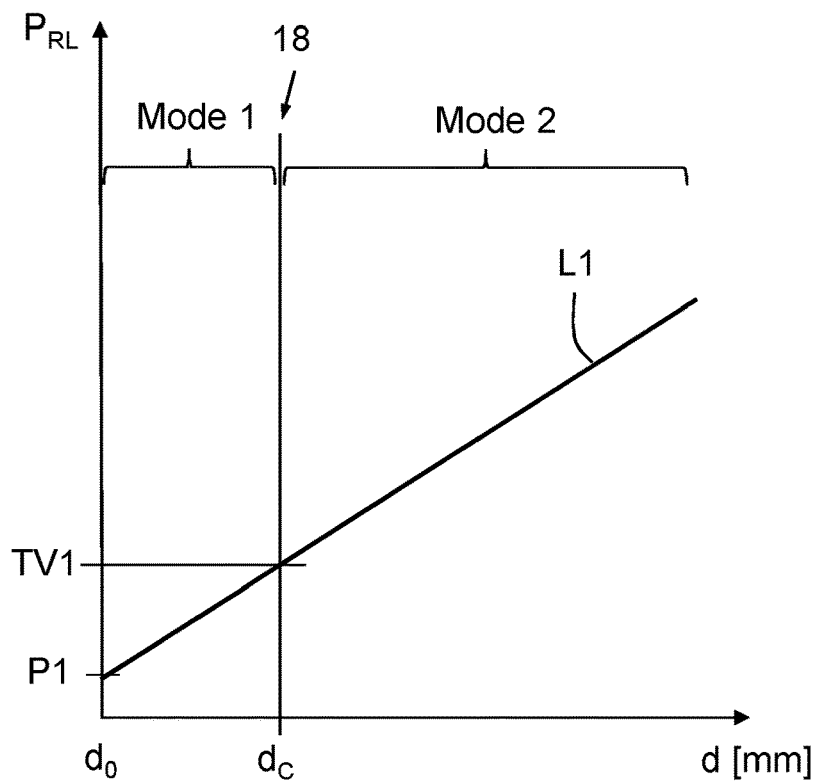
FIG. 9A-C show schematic function diagrams of some example embodiments of the counter pressure valve arrangement, FIG. 10-11 schematically show various example embodiments of a self-regulating direct-controlled counter pressure valve arrangement, FIG. 12-13 schematically show examples of implementation of the counter pressure valve arrangement in connection with a sectional valve assembly, FIG. 14 schematically show an example vehicle having a hydraulic system suitable for implementation of the counter pressure valve arrangement.

FIG. 9A schematically shows the function of an example embodiment of a zero-lapped counter pressure valve, wherein the horizontal axis represents valve member displacement "d" in millimetres and the vertical axis represents the pressure level $P_{RL}$ in the return line 4, and the line L1 represents valve member displacement "d" for a certain level of pressure level $P_{RL}$, given a certain spring member 9. This operating characteristic thus reflects a less complex design that rely merely on a mechanical spring member 9 for setting a fixed target counter pressure level in the return line 4. At pressure level P1 in the return line, the fluid force acting axially on the second end 20 of the valve member 22 is equal to the spring force acting axially on the first axial end 19 of the valve member 22. Furthermore, the inclination of the line L1 is a function of the spring constant of the spring member 9.

When the pressure level $P_{RL}$ in the return line 4 equals tank pressure, the valve member 22 displacement "d" is zero, i.e. valve member 22 seated against the valve seat in the valve housing. The valve member 22 is located in the first position 12 and the refill path 16 is open.

When the pressure level $P_{RL}$ in the return line 4 increases and becomes equal to P1 the valve member 22 starts to become displaced. In other words, at pressure level P1 in the return line 4, the counter force $F_C$ acting on the second axial end 20 of the valve member 22 is approximately equal to the spring force of the spring member 9 at the natural state. The valve member 22 is still located in the first position 12 and the refill path 16 is open.

When the pressure level $P_{RL}$ in the return line 4 increases further the valve member becomes proportionally more displaced, and when the pressure level $P_{RL}$ in the return line 4 equals a first threshold value TV1 the valve member is located at position "$d_C$", which corresponds to a transition point 18, in which both the pressure regulating port 7 and the tank port 8 are closed.

When the pressure level $P_{RL}$ in the return line 4 increases further, above the first threshold value TV1, the valve member 22 becomes further displaced and the pressure relief path 17 becomes opened.

Consequently, the first threshold value TV1, which may be referred to as a target counter pressure in the return line 4, is set by the spring member 9 and as long as the pressure level $P_{RL}$ in the return line 4 is lower than the first threshold value TV1 the counter pressure valve 6 is in operating mode 1 corresponding to active refill state. Furthermore, when the pressure level $P_{RL}$ in the return line 4 is equal to the first threshold value TV1 the counter pressure valve 6 is at a transition point corresponding to the closed valve, and as long as the pressure level $P_{RL}$ in the return line 4 is higher than the first threshold value TV1 the counter pressure valve 6 is in operating mode 2 corresponding to the pressure relief state. This applies for example to the embodiments of FIGS. 1-4 without a pilot pressure feed.

Figure 9B:
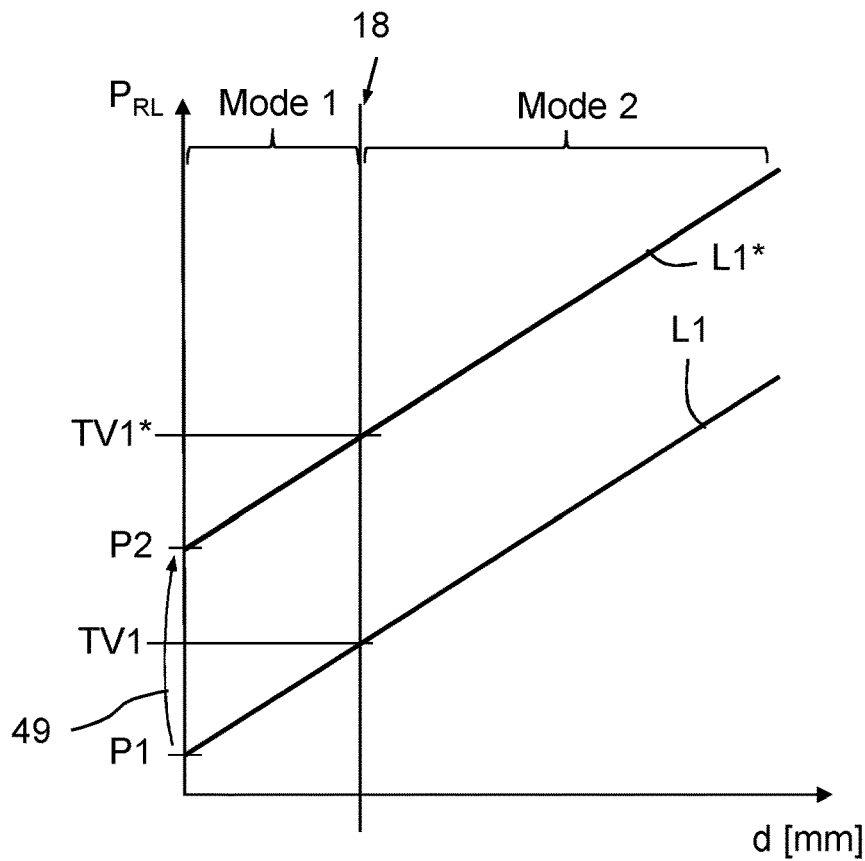

FIG. 9B shows an example operating characteristic of a more advanced version of the counter pressure valve arrangement, wherein the target counter pressure level in the return line 4 may be adjusted to better fit the current overall system operating condition. FIG. 9B thus reflects a more complex design that rely on the combination of the mechanical spring member 9 and a pilot pressure for setting a variable target counter pressure level in the return line 4.

Specifically, FIG. 9B schematically shows the result when a certain pilot pressure is applied, as illustrated by arrow 49, thereby causing a displacement of the line L1 to L1*. As a result, the valve member 22 starts to become displaced from the valve seat first when the pressure level $P_{RL}$ in the return line 4 equals P2, which occurs when the counter force $F_C$ acting on the second axial end 20 of the valve member 22 is approximately equal to the accumulated value of the spring force of the spring member 9 at the natural state and the applied pilot pressure at the pilot pressure port 32. At this condition, the valve member 22 is still located in the first position 12 and the refill path 16 is open.

When the pressure level $P_{RL}$ in the return line 4 increases further the valve member becomes proportionally more displaced, and when the pressure level $P_{RL}$ in the return line 4 equals an increased first threshold value TV1* the valve member is located at position "$d_C$", which corresponds to a transition point 18, in which both the pressure regulating port 7 and the tank port 8 are closed.

Consequently, the counter pressure valve 6 is in the active refill state as long as the pressure level $P_{RL}$ in the return line 4 is lower than the increased first threshold value TV1*, and the counter pressure valve 6 is in the pressure relief state as long as the pressure level $P_{RL}$ in the return line 4 is higher than the increased first threshold value TV1*. Hence, the applied pilot pressure results in an increased counter pressure level in the return line 4.

In other words, with reference to FIGS. 9A-B, the valve member 22 is configured to automatically shift to the first position 12 effecting fluid communication between the pump port 10 and the counter pressure regulating port 7 for supplying pressurised hydraulic fluid to the return line 4 when the pressure level of the hydraulic fluid in the return line is below the first fixed or variable threshold value TV1, TV1*, and the valve member 22 is configured to automatically shift to the second position 13 effecting fluid communication between the counter pressure regulating port 7 and the tank port 8 for discharging hydraulic fluid from the return line 4 to the tank 3 when the pressure level of the hydraulic fluid in the return line 4 is above the first fixed or variable threshold value TV1, TV1*.

Furthermore, with reference to the example embodiments of FIGS. 1-4, the counter pressure valve 6 may have a spring member 9 acting on the first axial end 19 of the moveable valve member 22 for biasing the valve member 22 towards the first position 12 of the valve member 22, and the first threshold value TV1 is a fixed threshold value determined by the properties of the spring member.

Furthermore, with reference to the example embodiments of FIGS. 5A-7, the counter pressure valve 6 may have a spring member 9 acting on the first axial end 19 of the moveable valve member 22 for biasing the valve member 22 towards the first position 12 of the valve member 22, and the first threshold value TV1* is a variable threshold value determined by the properties of the spring member and the pilot pressure supply to the pilot pressure port 32.

In addition, the valve member 22 is configured to shift to a closed position stopping fluid communication between the counter pressure regulating port 7, the tank port 8 and the pump port 10 at the transition point when the pressure level of the hydraulic fluid in the return line is equal to the first fixed or variable threshold value TV1, TV1*.

Figure 9C:
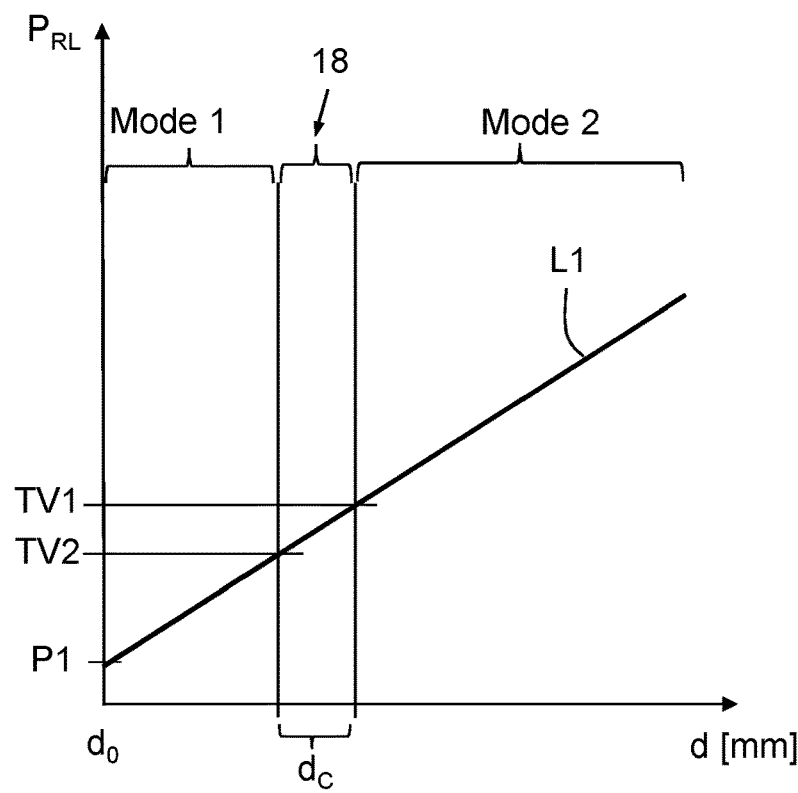

FIG. 9C schematically shows the function of an example embodiment of an overlapped counter pressure valve, i.e. a valve in which both the pressure regulating port 7 and the tank port 8 are maintained closed over a certain displacement range. Consequently, the transition point is larger in terms of valve displacement "d", and the counter pressure valve 6 is in mode 1, i.e. active refill state as long as the pressure level $P_{RL}$ in the return line 4 is lower than a second threshold value TV2, and the counter pressure valve 6 is in operating mode 2, i.e. pressure relief state as long as the pressure level $P_{RL}$ in the return line 4 is higher than a first threshold value TV1.

In other words, the valve member is configured to shift to the first position 12 effecting fluid communication between the pump port 10 and the counter pressure regulating port 7 for supplying pressurised hydraulic fluid to the return line 4 when the pressure level of the hydraulic fluid in the return line 4 is below a second fixed or variable threshold value TV2, and the valve member is configured to shift to the second position 13 effecting fluid communication between the counter pressure regulating port 7 and the tank port 8 for discharging hydraulic fluid from the return line 4 to the tank when the pressure level of the hydraulic fluid in the return line is above a first fixed or variable threshold value TV1.

Furthermore, in some example embodiments, the counter pressure valve has a spring member 9 acting on a first axial end 19 of the moveable valve member 22 for biasing the valve member towards the first position 12 of the valve member 22, and both the first and second threshold values TV1, TV2 are fixed threshold values determined by the properties of the spring member 9.

In addition, the valve member 22 is configured to shift to a closed position stopping fluid communication between the counter pressure regulating port 7, the tank port 8 and the pump port 10 when the pressure level of the hydraulic fluid in the return line 4 is below the first variable or fixed threshold value TV1 and above the second fixed or variable threshold value TV2.

Figure 10:
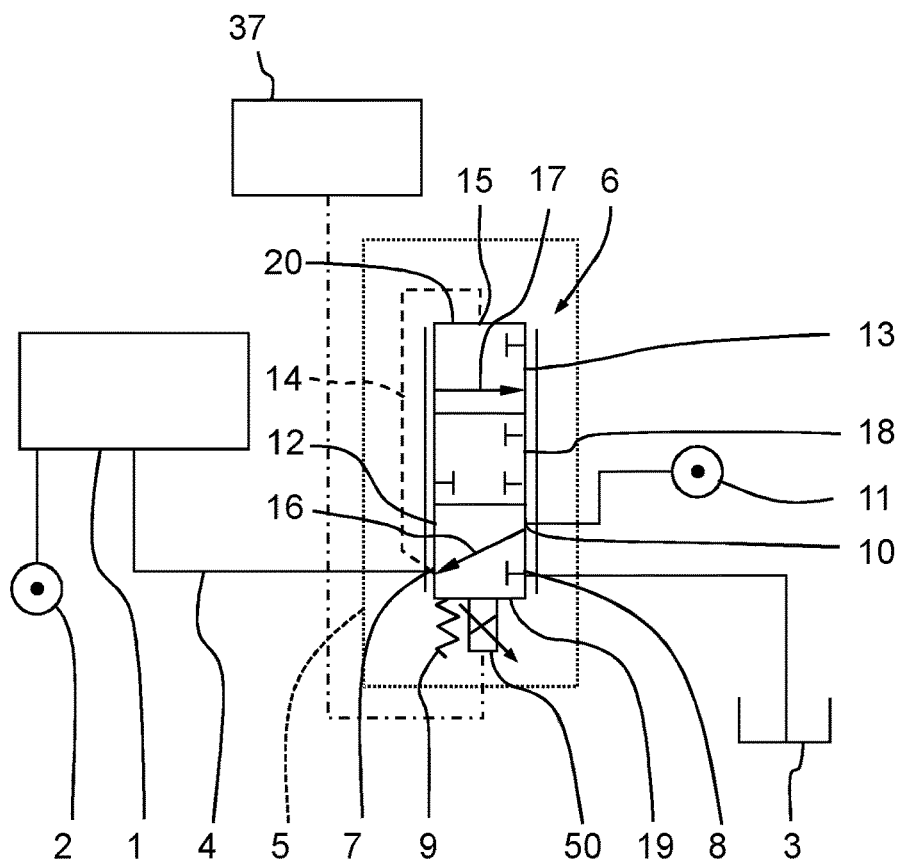

With reference to FIG. 10, the counter pressure valve may be adjustable in terms of counter pressure level not only by means of hydraulic pilot control of the valve member 22 of the counter pressure valve 6, but alternatively by direct control of the valve member 22, i.e. by electric control of the motion of the valve member 22. This is for example accomplished by providing an electromagnetic spool at an end region of the control valve 6, which spool is configured to interact with a magnet of the valve member 22 for providing an axial force acting on the valve member 22 when a current is supplied to the spool. The current supplied to the spool may be controlled by an electronic control unit 37, for example using pulse-width-modulation control of the valve member 22.

In other words, the counter pressure valve 6 may be a proportional, solenoid-controlled, direct-operated control valve 6 having a first solenoid 51 acting directly or indirectly on the first axial end 19 of the valve member 22 for shifting the directional control valve to, or at least towards, the first position.

Figure 11:
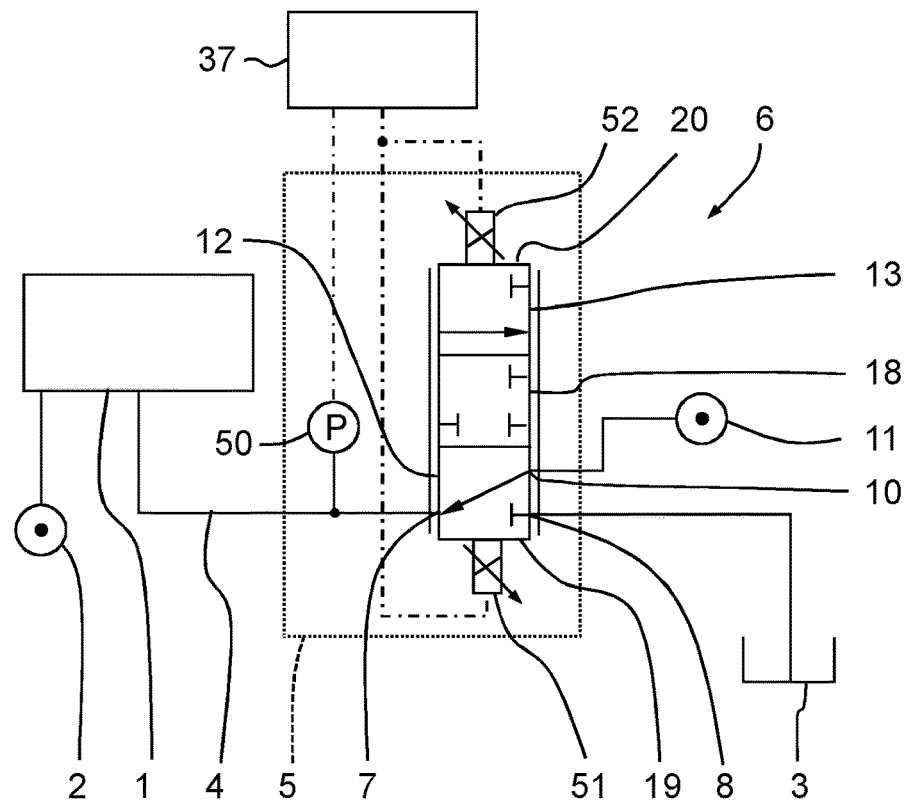

FIG. 11 shows still a further example embodiment of the counter pressure valve 6 according to the present disclosure, wherein one valve member 22 is controlled by two individual solenoids, one acting on each end of the valve member 22. The position of the valve member 22 may thus be controlled by the electronic control system via the first and second solenoids 51, 52, based for example on detected pressure level in the return line 4, as provided by a pressure sensor 50.

In other words, the counter pressure valve 6 may be a proportional, solenoid-controlled, direct-operated control valve 6 having a first solenoid 51 acting directly or indirectly on the first axial end 19 of the valve member 22 for shifting the counter pressure valve 6 to, or at least towards, the first position 12, and a second solenoid 52 acting directly or indirectly on a second axial end 20 of the valve member 22 for shifting the counter pressure valve 6 towards a second actuation position 13.

Figure 12:
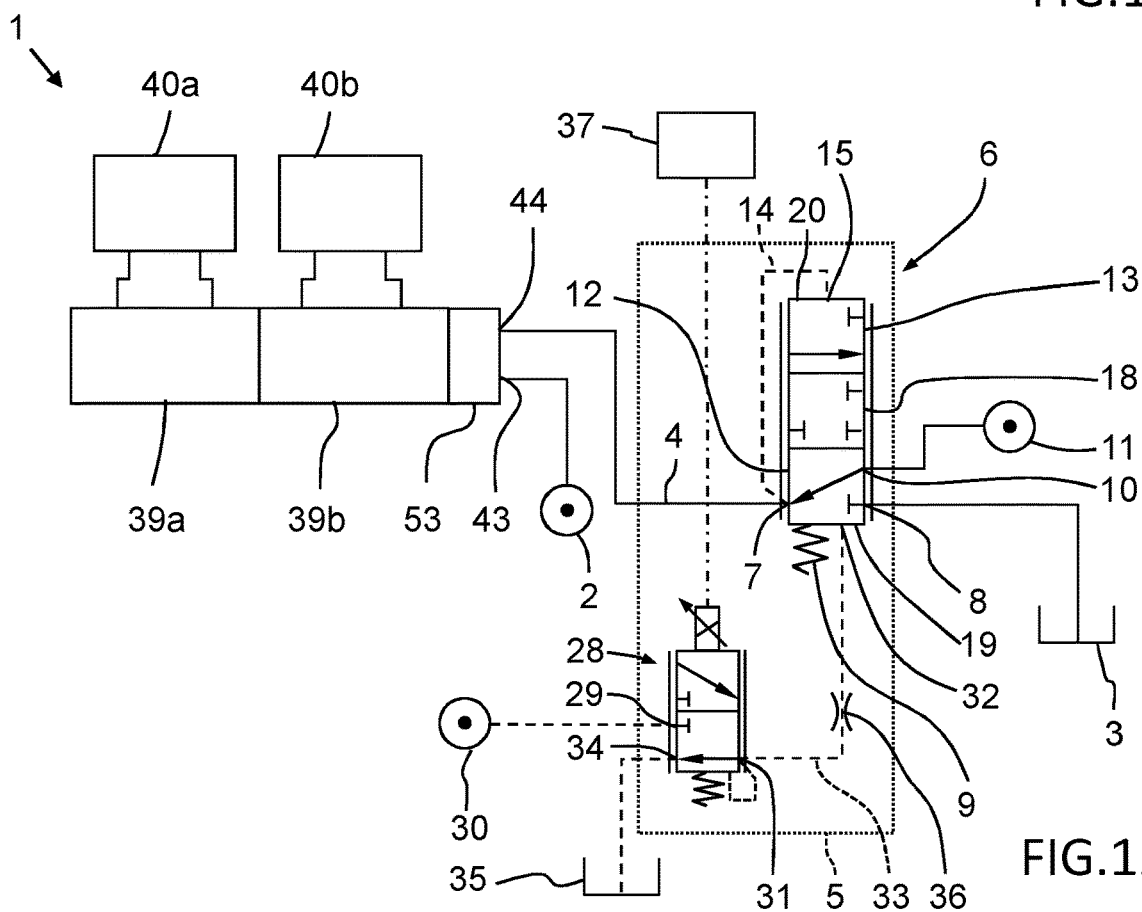

The counter pressure valve arrangement according to the present disclosure may be used in connection with a stacked sectional or monoblock valve arrangement, as described below with reference to FIG. 12, which schematically shows the main parts of a hydraulic system. Specifically, the hydraulic actuator arrangement includes a stacked sectional or monoblock valve arrangement having two stacked valve sections 39a, 39b, each including a directional control valve having first and second work ports fluidly connected to an individual hydraulic consumer 40a, 40b, wherein a pressure source 2, such as a hydraulic pump, is fluidly connected to an inlet port 43 of the stacked sectional or monoblock valve arrangement, and wherein the counter pressure valve 6 is fluidly connected with a discharge port of the stacked sectional or monoblock valve arrangement via a return line 4.

Figure 13:
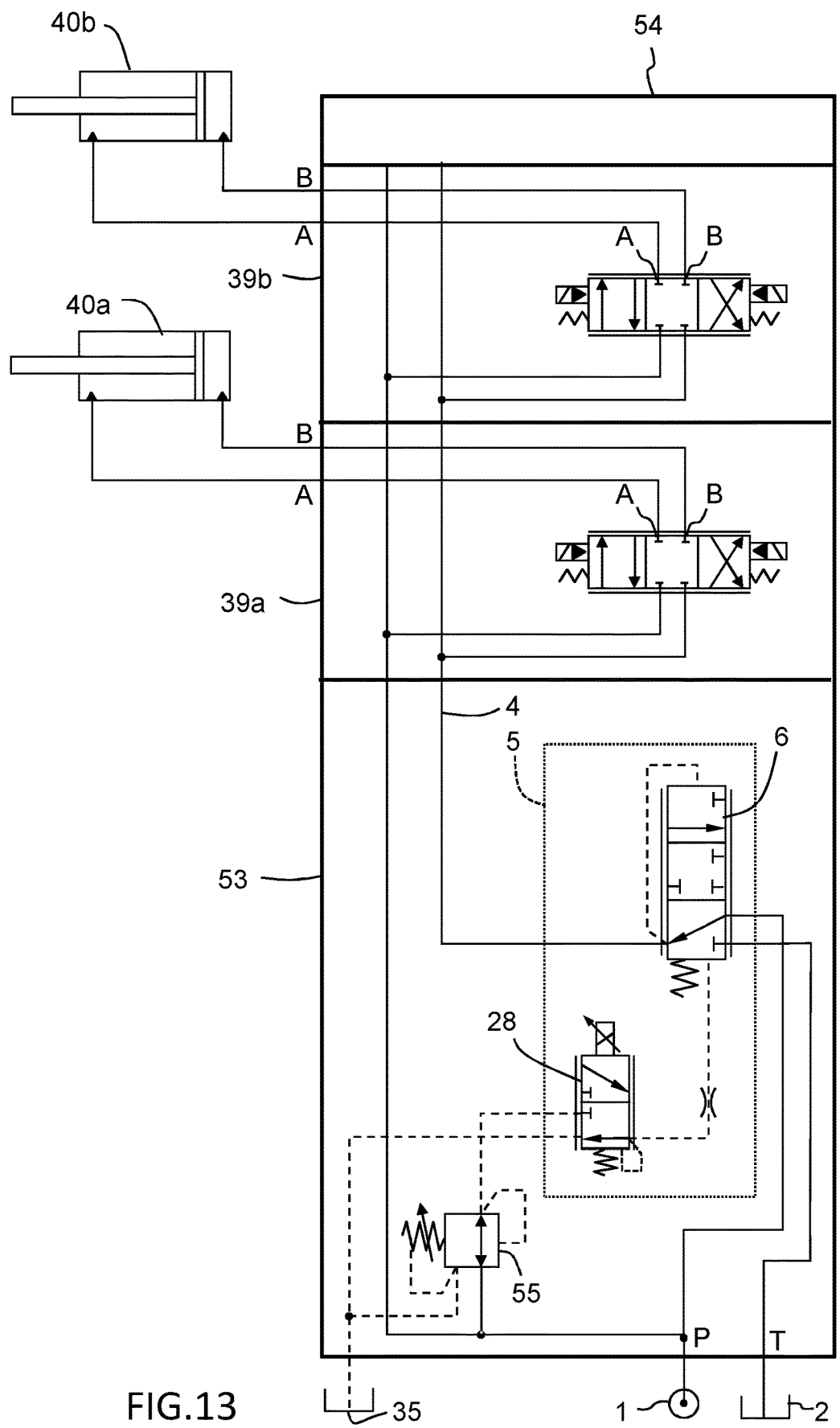

Furthermore, as schematically illustrated in FIG. 13, the counter pressure valve arrangement 5 may be integrated within a stacked sectional or monoblock valve arrangement. Specifically, the valve system is FIG. 13 shows a control valve arrangement 39 having a stacked sectional or monoblock valve arrangement with two stacked valve sections 39a, 39b, each including a directional control valve having a first work port A and a second work port B, each fluidly connected to an individual flow port of an individual hydraulic actuator 40a, 40b, wherein the counter pressure valve 6 is fluidly connected with a discharge port 44 of the directional control valve of each of the at least two stacked sections via a return line 4, and wherein the counter pressure valve arrangement is integrated in an inlet section 53 of the stacked sectional or monoblock valve arrangement.

The valve sections 39a, 39b are sandwiched between the inlet section 53 and an end section 54. In the example embodiment of FIG. 13, the inlet sections also includes a pressure reducing valve 55 for providing the pilot fluid to the pilot valve 28 of the counter pressure valve arrangement 5. The sectional design of the valve arrangement enables a highly modular design of the redundant valve arrangement according to the disclosure because the number of work sections, i.e. the number of directional control valves, may be easily selected and stacked together for each specific application.

Figure 14:
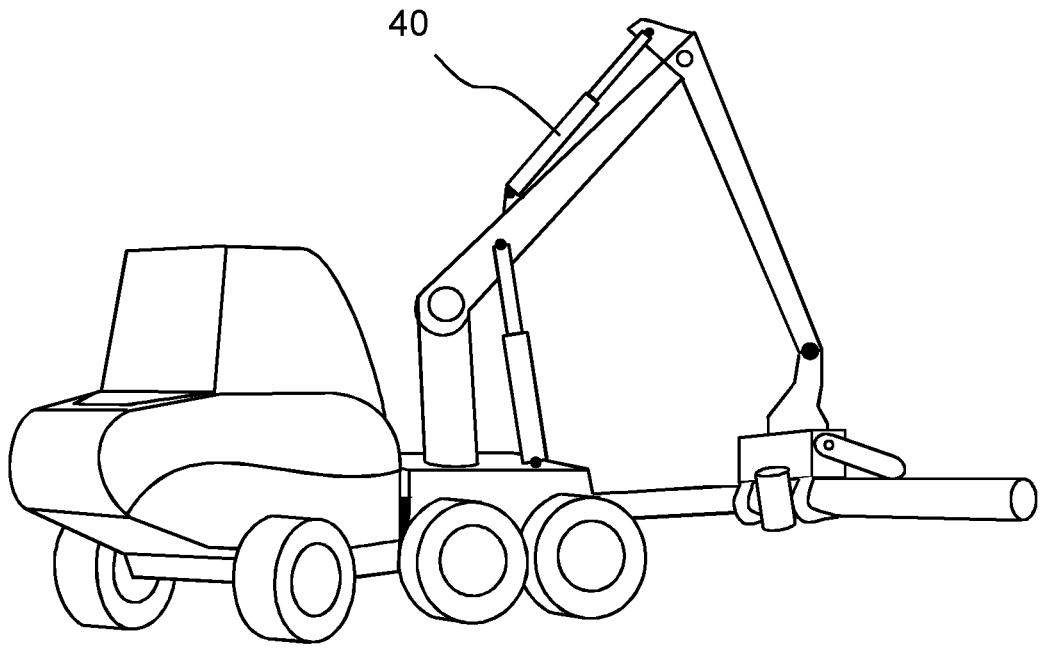

With reference to FIG. 14, the present disclosure also relates to a vehicle comprising the hydraulic actuator control circuit as described above. FIG. 14 schematically shows a vehicle in form of a forest harvester having a hydraulic actuator control circuit for propulsion and/or control of a set of hydraulic actuators 40 for the work tool and its actuator arm, etc. However, the hydraulic actuator control circuit is of course not limited to this specific type of vehicle but may alternatively be implemented in any other type of vehicle or stationary equipment.

Figure 15:
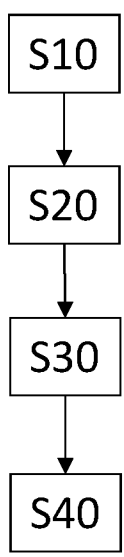
FIG. 15 shows the main steps of a method for controlling a pressure level in a return line using a counter pressure valve arrangement.

The present disclosure also relates to a method for controlling a pressure level of a hydraulic fluid in a return line from a hydraulic actuator arrangement using a counter pressure valve arrangement. The main steps of the method are described below with reference to FIG. 15, wherein the method comprises a first step S10 of providing a counter pressure valve 5 having a moveable valve member 22, a counter pressure regulating port 7, a tank port 8 and a pump port 10. The method further comprises a second step S20 of connecting the counter pressure regulating port 7 to the hydraulic actuator arrangement 1 via the return line 4, connecting the tank port 8 to a tank 3 having low pressure hydraulic fluid, and connecting the pump port 10 to a source of pressurised hydraulic fluid 11. Moreover, the method comprises a third step S30 of supplying pressurised hydraulic fluid to the return line 4 by setting the valve member 22 in a first position, also referred to as active refill position, thereby effecting fluid communication between the pump port 10 and the counter pressure regulating port 7. Finally, the method comprises a fourth step S40 of discharging hydraulic fluid from the return line 4 to the tank 3 by setting the valve member 22 in a second position, also referred to as a pressure relief position, thereby effecting fluid communication between the counter pressure regulating port 7 and the tank port 8.

The term "fluidly connected to" used herein refers to both a direct fluid connection between two parts or ports, wherein there are no fluid components installed in the fluid path, but also an indirect fluid connection having one or more intermediate fluid components located therebetween.

A direct fluid connection between two parts or ports is generally characterised in that no flow valves or fluid controlling parts or filters or the like are installed in the fluid path connecting the two part or ports. An indirect fluid connection between two parts or ports is generally characterised by the presence of at least one flow valve or fluid controlling part or filter or the like is installed in the fluid path connecting the two part or ports.

A hydraulic consumer, or simply a consumer, refers herein to a hydraulic device the converts hydraulic energy into mechanical energy, such as for example a hydraulic cylinder or a hydraulic motor.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Moreover, all possible combinations of features described above with reference to FIGS. 1-14 have not been included in the disclosure for keeping the disclosure clear and concise. However, it is evident that features described merely in the context of one or some example embodiments may be readily combined or implemented with other features or embodiments of the disclosure, even if not explicitly showed, unless being inconsistent. For example, it is evident that the non-controlled counter pressure valve of FIGS. 1-4 or the direct controlled counter pressure valve of FIGS. 10-11 may be implemented together with hydraulic actuator arrangements described with reference to FIGS. 7, 12 and 13, or the like, even if not being explicitly described.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| REFERENCE SIGNS | |
|---|---|
| 1: | Hydraulic actuator arrangement |
| 2: | Pressure source |
| 3: | Tank |
| 4: | Return line |
| 5: | Counter pressure valve arrangement |
| 6: | Counter pressure valve |
| 7: | Counter pressure regulating port |
| 8: | Tank port |
| 9: | Spring member |
| 10: | Pump port |
| 11: | Refill Pressure source |
| 12: | First position |
| 13: | Second position |
| 14: | Counter pressure sensing path |
| 15: | Counter pressure sensing port |
| 16: | Refill path |
| 17: | Pressure relief path |
| 18: | Transition point |
| 19: | First axial end |
| 20: | Second axial end |
| 21: | Drain passage |
| 22: | Valve member |
| 23: | Spool bore |
| 24: | Valve housing |
| 26: | Spring chamber |
| 27: | Pilot tank |
| 28: | Pilot valve |
| 29: | Input port |
| 30: | Pilot pressure source |
| 31: | Output port |
| 32: | Pilot pressure port |
| 33: | Pilot pressure line |
| 34: | Discharge port |
| 35: | Pilot tank |
| 36: | Throttle device |
| 37: | Electronic control system |
| 38: | Hydraulic consumer |
| 39: | Control valve arrangement |
| 40: | Hydraulic actuator |
| 41: | First flow port |
| 42: | Second flow port |
| 43: | Inlet port |
| 44: | Discharge port |

| REFERENCE SIGNS | |
|---|---|
| 45: | First operating state |
| 46: | Second operating state |
| 47: | Third operating state |
| 48: | Load |
| 49: | Arrow |
| 50: | Pressure sensor |
| 51: | First solenoid |
| 52: | Second solenoid |
| 53: | Inlet section |
| 54: | End section |
| 55: | Pressure reducing valve |
| 56: | Leakage throttle |
| 57. | Pilot pressure supply line |
| 58. | Pilot throttle |
| 59. | Pressure feedback |

The invention claimed is:

1. A hydraulic actuator control circuit for controlling supply and discharge of hydraulic fluid to and from a hydraulic actuator, the hydraulic actuator control circuit comprising:
   a hydraulic pump;
   a tank for storing low pressure hydraulic fluid,
   a hydraulic actuator,
   a control valve, and
   a counter pressure valve arrangement for controlling a pressure level of a hydraulic fluid in a return line from the control valve,
   wherein the control valve has at least a first work port (A) fluidly connected to a first flow port of hydraulic actuator, an inlet port fluidly connected to an outlet port of the hydraulic pump, and a discharge port,
   wherein the control valve is configured for controlling a direction of supply of hydraulic oil to the hydraulic actuator and a direction of discharge of hydraulic oil from the hydraulic actuator, and
   wherein the counter pressure valve arrangement comprises a counter pressure valve having:
      a moveable valve member,
      a counter pressure regulating port fluidly connected to the discharge port of the control valve via the return line,
      a tank port fluidly connected to the tank or a low pressure reservoir for storing low pressure hydraulic fluid, and
      a pump port fluidly connected to a source of pressurised hydraulic fluid,
      wherein a first position of the valve member effects fluid communication between the pump port and the counter pressure regulating port for supplying pressurised hydraulic fluid to the return line, and
      wherein a second position of the valve member effects fluid communication between the counter pressure regulating port and the tank port for discharging hydraulic fluid from the return line to the tank or the low pressure reservoir.

2. The hydraulic actuator control circuit according to claim 1, wherein the valve member is configured to shift to the first position effecting fluid communication between the pump port and the counter pressure regulating port for supplying pressurised hydraulic fluid to the return line when the pressure level of the hydraulic fluid in the return line is below a first threshold value or below a second fixed or variable threshold value, and wherein the valve member is configured to shift to the second position effecting fluid communication between the counter pressure regulating port and the tank port for discharging hydraulic fluid from the return line to the tank when the pressure level of the hydraulic fluid in the return line is above a first fixed or variable threshold value.

3. The hydraulic actuator control circuit according to claim 2, wherein the counter pressure valve has a spring member acting on a first axial end of the moveable valve member for biasing the valve member towards the first position of the valve member, and wherein the first threshold value is a fixed threshold value determined by the properties of the spring member, or wherein both the first and second threshold values are fixed threshold values determined by the properties of the spring member.

4. The hydraulic actuator control circuit according to claim 2, wherein the valve member is configured to shift to a closed position stopping fluid communication between the counter pressure regulating port, the tank port and the pump port when the pressure level of the hydraulic fluid in the return line is equal to the first fixed or variable threshold value, or when the pressure level of the hydraulic fluid in the return line is below the first threshold value and above the second fixed or variable threshold value.

5. The hydraulic actuator control circuit according to claim 1, wherein the counter pressure valve is a spool valve, wherein the moveable valve member is spool axially slidable within a spool bore of a housing, wherein a first axial position of the spool corresponds to the active refill position of the counter pressure valve, and wherein a second axial position of the spool corresponds to the pressure relief position of the counter pressure valve.

6. The hydraulic actuator control circuit according to claim 1, wherein the counter pressure valve has a spring member acting on a first axial end of the moveable valve member for biasing the valve member towards the first position of the valve member.

7. The hydraulic actuator control circuit according to claim 1, wherein the counter pressure valve arrangement further has a counter pressure sensing path fluidly connecting the counter pressure regulating port with a counter pressure sensing port of the counter pressure valve, such that fluid pressure at the counter pressure regulating port acts on an axial end of the valve member for biasing the valve member towards the second position.

8. The hydraulic actuator control circuit according to claim 1, further comprising an electrohydraulic pilot valve that provides a variable pilot pressure acting on a first axial end of the valve member of the counter pressure valve.

9. The hydraulic actuator control circuit according to claim 8, wherein the electrohydraulic pilot valve has a input port configured to be fluidly connected to a pressure source, an output port configured to be connected to a pilot pressure port of a first axial end of the counter pressure valve via a pilot pressure line, and a discharge port configured to be connected to a tank or low pressure reservoir.

10. The hydraulic actuator control circuit according to claim 9, wherein a throttle device is provided in the pilot pressure line fluidly connecting the outlet port of the electrohydraulic pilot valve and pilot pressure port of the first axial end of the spool of the counter pressure valve.

11. The hydraulic actuator control circuit according to claim 9, further comprising an electronic control system operably connected to the electrohydraulic pilot valve for controlling operation of the electrohydraulic pilot valve in real-time based on the operating condition of the hydraulic actuator arrangement.

12. The hydraulic actuator control circuit according to claim 11, wherein the electronic control system is configured for controlling operation of the electrohydraulic pilot valve in real-time based on a pilot valve control setting, which defines a pilot valve control parameter as a function of one or more operating parameters of the hydraulic actuator arrangement.

13. The hydraulic actuator control circuit according to claim 1, wherein the counter pressure valve is proportional, solenoid-controlled, direct-operated control valve having a first solenoid acting directly or indirectly on a first axial end of the valve member for shifting the directional control valve to, or at least towards, the first position.

14. The hydraulic actuator control circuit according to claim 1, wherein the hydraulic pump is fluidly connected also to the pump port of the counter pressure valve for supplying pressurised hydraulic fluid to the counter pressure valve, or wherein an auxiliary hydraulic pump is fluidly connected to the pump port of the counter pressure valve for supplying pressurised hydraulic fluid to the counter pressure valve.

15. The hydraulic actuator control circuit according to claim 1, wherein the hydraulic actuator control circuit is not configured to supply pressurized hydraulic fluid from the hydraulic pump to the counter pressure valve and further to the tank without having passed the hydraulic actuator.

16. The hydraulic actuator control circuit according to claim 1, wherein the control valve arrangement has a first work port (A) fluidly connected to a first flow port of hydraulic actuator and a second work port (B) fluidly connected to a second flow port of hydraulic actuator, wherein a first operating state of the control valve arrangement effects fluid communication between the inlet port and first work port (A) of the control valve arrangement, as well as between the second work port (B) and the discharge port of the control valve arrangement, and wherein a second operating state of the control valve arrangement effects fluid communication between the inlet port and second work port (B) of the control valve arrangement, as well as between the first work port (A) and the discharge port of the control valve arrangement.

17. The hydraulic actuator control circuit according to claim 1, wherein the control valve arrangement includes a stacked sectional or monoblock valve arrangement having at least one stacked valve section including a directional control valve having at least a first work port (A) fluidly connected to a first flow port of an individual hydraulic actuator,
    wherein the counter pressure valve is fluidly connected with a discharge port of the directional control valve of the at least one stacked valve section via a return line, and
    wherein the counter pressure valve arrangement is integrated in the stacked sectional or monoblock valve arrangement.

18. A vehicle comprising the hydraulic actuator control circuit according to claim 1.

19. A method for controlling a pressure level of a hydraulic fluid in a return line from a control valve of a hydraulic actuator control circuit using a counter pressure valve arrangement,
    wherein the hydraulic actuator control circuit comprises:
        a hydraulic pump; a tank for storing low pressure hydraulic fluid, a hydraulic actuator, a control valve, and a counter pressure valve arrangement for controlling a pressure level of a hydraulic fluid in a return line from the control valve, wherein the control valve has at least a first work port (A) fluidly connected to a first flow port of hydraulic actuator, an inlet port fluidly connected to an outlet port of the hydraulic pump, and a discharge port, wherein the counter pressure valve has a moveable valve member, a counter pressure regulating port, a tank port and a pump port, wherein the counter pressure regulating port is connected to the discharge port of the control valve via the return line, wherein the tank port is connected to a tank having low pressure hydraulic fluid, and wherein the pump port is connected to a source of pressurised hydraulic fluid, the method comprising:

supplying pressurised hydraulic fluid to the return line by setting the valve member in the first position, thereby effecting fluid communication between the pump port and the counter pressure regulating port, and discharging hydraulic fluid from the return line to the tank by setting the valve member in a second position, thereby effecting fluid communication between the counter pressure regulating port and the tank port.

* * * * *